US008812337B2

(12) United States Patent
Ptak et al.

(10) Patent No.: US 8,812,337 B2
(45) Date of Patent: Aug. 19, 2014

(54) RESOURCE ALLOCATION BASED ON RETAIL INCIDENT INFORMATION

(75) Inventors: Jennifer Ptak, Minneapolis, MN (US); Matthew Caven, Ham Lake, MN (US); Atasi Sinha, Kolkata (IN); Swathi RShetty, Mangalore (IN); Prithwijit Mjumdar, Kolkata (IN); Nikhil Khanolkar, Mumbai (IN); Nikesh Suthar, Bikaner (IN); Indraneel Peratla, Vizianagram (IN); Dhrubajyoti Chaudhuri, Kolkata (IN); Bhaskar Roy, Delhi (IN)

(73) Assignee: Target Brands, Inc., Minneapolis, MN (US)

( * ) Notice: Subject to any disclaimer, the term of this patent is extended or adjusted under 35 U.S.C. 154(b) by 288 days.

(21) Appl. No.: 13/414,425

(22) Filed: Mar. 7, 2012

(65) Prior Publication Data

US 2013/0103443 A1 Apr. 25, 2013

Related U.S. Application Data

(60) Provisional application No. 61/549,572, filed on Oct. 20, 2011.

(51) Int. Cl.
*G06F 17/00* (2006.01)

(52) U.S. Cl.
USPC ........................................................ 705/7.13

(58) Field of Classification Search
USPC ........................................................ 705/7.13
See application file for complete search history.

(56) References Cited

U.S. PATENT DOCUMENTS

| 8,099,339 B1 | 1/2012 | Pinsonneault et al. |
| 2002/0067272 A1 | 6/2002 | Lemelson et al. |
| 2003/0055706 A1 | 3/2003 | Statfeld |
| 2004/0153663 A1 | 8/2004 | Clark et al. |
| 2006/0020424 A1 | 1/2006 | Quindel |
| 2007/0174099 A1 | 7/2007 | Ostroscki et al. |
| 2008/0021759 A1* | 1/2008 | Wasley ........................... 705/9 |
| 2008/0201214 A1 | 8/2008 | Aaron et al. |
| 2009/0006286 A1 | 1/2009 | Angell et al. |
| 2009/0198641 A1* | 8/2009 | Tortoriello .................... 706/52 |
| 2010/0131284 A1 | 5/2010 | Duffy |
| 2011/0145032 A1 | 6/2011 | Stearns |

FOREIGN PATENT DOCUMENTS

CA 2602720 A1 9/2006

OTHER PUBLICATIONS

Office Action from Canadian Patent Application No. 2,785,952, mailed Sep. 10, 2013 (5 pages).
Compstat, http://en.wikipedia.org/wiki/compstat, Sep. 30, 2011, 8 pages.

(Continued)

*Primary Examiner* — Thomas Dixon
(74) *Attorney, Agent, or Firm* — Merek, Blackmon & Voorhees, LLC

(57) ABSTRACT

Security personnel time is assigned to a store property by generating an incident score based on a probability of an incident occurring on a store property. A set of ranges of incident scores, each range being associated with a number of hours of security personnel time, are retrieved from computer memory. A range of incident scores in the set of ranges of incident scores that the generated incident score falls within is identified and an associated number of hours of security personnel time is retrieved. Security personnel time is assigned to the store property using a processor based on the number of hours of security personnel time retrieved for the identified range of incident scores.

20 Claims, 25 Drawing Sheets

(56) References Cited

OTHER PUBLICATIONS

Crime mapping, http://en.wikipedia.org/wiki/crime_mapping, Sep. 30, 2011, 3 pages.
From Description to Prediction: Crime Mapping, Tech Beat, http://www.justnet.org/TechBeat%20Files/CrimeMapSum01.pdf, 2001, 4 pages.
Crimestat, http://en.wikipedia.org/wiki/CrimeStat, Dec. 9, 2011, 7 pages.
British Police Trials Crime Predicting Software, http://news.softpedia.com/news/british-police-trials-crime-predicting-software-149127.s . . . , Jul. 26, 2010, 2 pages.
Derek J. Paulsen, Catching Lightning in a Bottle: Forecasting Next Events, 2005 iPSY Conference, 25 pages.
Bryan Hill, Narrowing the Search: Utilizing a Probability Grid in Tactical Analysis, http://www.scribd.com/doc/6714588/Translating-Research-Into-Practice-Reflections-on-the-Diffusion-of-Crime-Mapping-Innovation#archive, 2001, 14 pages.
Bonnsri Dickinson, Police Forecast Using Earthquake Prediction Models, http://smartplanet.com/blog/science-scope/police-forecast-crimes-using-earthquake-prediction-models/9840, Aug. 17, 2011, 3 pages.
The Day Before Zero, Prediction Methods for Crime, http://blog.damballa.com/?p=1377, Nov. 4, 2011, 2 pages.
Daily Crime Forecast, http://crimeforecast/, Dec. 9, 2011, 3 pages.
The Economist, Crime Prediction, Time Bandits, Prospective "hotpspot" maps show where criminals are going to be active, http://www.economist.com/node/2647118, Nov. 4, 2011, 3 pages.
Applying Spatiotemporal and Demographic Data to Locate Next Crime Location, http://www.math.washington.edu/~morrow/mcm/7501.pdf, Feb. 22, 2010, 16 pages.
Predictive Analytics, http://en/wikipedia.org/wiki/predictive_analytics, Sep. 30, 2011, 12 pages.
Office Action from Canadian Patent Application No. 2,785,952, mailed Apr. 10, 2013 (5 pages).
Graham J. Morris, revised by Edwin D. Reilly, "Encyclopedia of Computer Science," 4th ed., ed. By Anthony Ralston, Edwin D. Reilly & David Hemmendinger, Nature Publishing Group, London, 2000 (34 pages).
James J. Willis et al., "Compstat and Organizational Change in the Lowell Police Department: Challenges and Opportunities," Police Foundation, Washington, 2004 (97 pages).
Shane D. Johnson et al., "Prospective Crime Mapping in Operational Context: Final Report, Online Report 19/07," UK Home Office, Research Development and Statistics Directorate, http://www.academia.edu/973382/Prospective_Crime_Mapping_in_Operational_Context_Final_Report, 2007 (111 pages).
Office Action from Canadian Patent Application No. 2,785,952, mailed Feb. 7, 2014 (8 pages).

\* cited by examiner

| INCIDENT TYPES | PERSONNEL POSITION | CATEGORY |
|---|---|---|
| Vandalism – Arson<br>Civil Unrest<br>Fatality – Homicide<br>Fatality- Other<br>Kidnapping | Executive Manager<br>Investigator Manager | 1 |
| Burglary<br>Burglary – Attempted | Executive Manager<br>Investigator | 2 |
| Theft from Vehicle<br>Vehicle Theft<br>Vandalism<br>Vandalism – Graffiti | Uniformed Security | 3 |
| Robbery<br>Robbery – Attempted<br>Threat<br>Bomb Threat<br>Stalking<br>Physical Assault<br>Sexual Assault<br>Sexual Misconduct | Uniformed Security<br>Plain-Clothes Security<br>Investigator | 4 |

FIG. 5

| LOCATION | BURGLARY COUNT | COUNT PERCENTAGE |
|---|---|---|
| STORE 1 | 5 | 0.192 |
| STORE 2 | 1 | 0.038 |
| STORE 3 | 0 | 0.000 |
| STORE 4 | 7 | 0.269 |
| STORE 5 | 3 | 0.115 |
| STORE 6 | 10 | 0.385 |
| TOTAL | 26 | 1 |

FIG. 6

| INCIDENT TYPE | FINANCIAL IMPACT MEASURE | GUEST EMPLOYEE IMPACT MEASURE | REP. MEASURE | SEVERITY MEASURE | OCCURANCE MEASURE | ABILITY TO IMPACT MEASURE | RPN |
|---|---|---|---|---|---|---|---|
| Burglary | 5 | 3 | 7 | 5.0 | 1 | 6 | 30 |
| Burglary Attempted | 4 | 3 | 3 | 3.3 | 1 | 6 | 20 |
| Robbery | 3 | 7 | 6 | 5.3 | 1 | 3 | 16 |
| Robbery – Attempted | 2 | 5 | 3 | 3.3 | 1 | 3 | 10 |
| Stalking | 2 | 7 | 3 | 4.0 | 4 | 3 | 48 |
| Physical Assault | 3 | 5 | 7 | 5.0 | 4 | 3 | 60 |
| Sexual Assault | 3 | 8 | 8 | 6.3 | 1 | 3 | 19 |
| Sexual Misc. | 2 | 4 | 3 | 3.0 | 4 | 3 | 36 |
| Threat | 2 | 5 | 3 | 3.3 | 6 | 7 | 140 |
| Bomb Threat | 7 | 4 | 7 | 6.0 | 1 | 2 | 12 |
| Fatality – Homicide | 8 | 10 | 8 | 8.7 | 1 | 3 | 26 |
| Fatality – Other | 4 | 10 | 3 | 5.7 | 1 | 1 | 6 |
| Civil Unrest | 4 | 2 | 7 | 4.3 | 1 | 2 | 9 |
| Kidnap | 5 | 8 | 8 | 7.0 | 1 | 3 | 21 |
| Vandalism – Arson | 8 | 4 | 7 | 6.3 | 1 | 3 | 19 |
| Vandalism | 3 | 3 | 3 | 3.0 | 5 | 3 | 45 |
| Vandalism – Graffiti | 3 | 2 | 3 | 2.7 | 6 | 3 | 48 |
| Property Theft | 2 | 3 | 3 | 2.7 | 4 | 3 | 32 |
| Theft from Vehicle | 2 | 3 | 3 | 2.7 | 5 | 3 | 40 |
| Vehicle Theft | 2 | 4 | 3 | 3.0 | 2 | 3 | 18 |

FIG. 9

| INCIDENT/ SHORTAGE/ APPREHENSION | Priority Order (Leadership) | | Priority Order (Non-Leadership) | |
|---|---|---|---|---|
| | High | Low | High | Low |
| Cat. 1 Incidents | None | None | None | None |
| Cat. 2 Incidents | None | None | Tools | Tools |
| Cat. 3 Incidents | Leader | Executive Leader | Uniformed Security | Uniformed Security |
| Cat. 4 Incidents | Executive Leader | Leader | Uniformed Security | Investigation Tech |
| External ORC | Anybody | Anybody | Plain Clothes Security | Investigator Specialist |
| External Opportunity | Anybody | Anybody | Plain Clothes Security | Investigator Specialist |
| External Apprehension | Anybody | Anybody | Plain Clothes Security | Investigator Specialist |
| Internal ORC | Executive Leader | Leader | Not required | Investigator |
| Internal Opportunity | Executive Leader | Leader | Not required | Investigator |
| Internal Apprehension | Executive Leader | Leader | Not required | Investigator |
| POS | None | None | Tools | Uniformed Security |

FIG. 15

| Uniformed Personnel Hours | Min Cat.3 Incident Score | Max Cat. 3 Incident Score |
|---|---|---|
| 0 | | 60 |
| 20 | 60 | 70 |
| 40 | 70 | 90 |
| 60 | 90 | 95 |
| 80 | 95 | 115 |
| 100 | 115 | 125 |
| 120 | 125 | 135 |
| 160 | 135 | 140 |
| >160 | 140 | |

| Uniformed Personnel Hours | Min Cat. 4 Incident Score | Max Cat. 4 Incident Score |
|---|---|---|
| 0 | | 200 |
| 20 | 200 | 210 |
| 40 | 210 | 250 |
| 60 | 250 | 270 |
| 80 | 270 | 290 |
| 100 | 290 | 300 |
| 120 | 300 | 320 |
| 140 | 320 | 330 |
| 160 | 330 | 350 |
| >160 | 350 | |

RESOURCE ALLOCATION BASED ON RETAIL INCIDENT INFORMATION

BACKGROUND

In a retail environment, assets protection departments work to provide a safe and secure environment for the customers and employees of a store and to prevent theft. To achieve these objectives, assets protection departments employ multiple types of assets protection resources such as personnel hours, leadership, and tools.

Since each resource allocated for assets protection has an associated cost, allocating too many assets protection resources to a store results in unnecessary expenses. However, allocating too few assets protection resources is also undesirable.

The discussion above is merely provided for general background information and is not intended to be used as an aid in determining the scope of the claimed subject matter. The claimed subject matter is not limited to implementations that solve any or all disadvantages noted in the background.

SUMMARY

Security personnel time is assigned to a store property by generating an incident score based on a probability of an incident occurring on a store property. A set of ranges of incident scores, each range being associated with a number of hours of security personnel time, are retrieved from computer memory. A range of incident scores in the set of ranges of incident scores that the generated incident score falls within is identified and an associated number of hours of security personnel time is retrieved. Security personnel time is assigned to the store property using a processor based on the number of hours of security personnel time retrieved for the identified range of incident scores.

In further embodiments, security personnel time is assigned to a store by generating a shortage score for the store for a first type of product shortage, the shortage score representative of a dollar amount of product shortage due to the first type of product shortage. A set of ranges of shortage scores for the first type of product shortage are retrieved from computer memory, each range being associated with a respective different number of hours of security personnel time. A range of shortage scores in the set of ranges of shortage scores that the generated shortage score falls within is identified and an associated number of hours of security personnel time is retrieved. Security personnel time is assigned to the store property based on the retrieved number of hours of security personnel time.

A level of assets protection personnel is assigned to a store through steps that include generating an incident score based on a probability of an incident occurring at a store and generating a shortage score representative of a dollar amount of product shortage at the store that is attributed to a first type of shortage. The incident score is applied to a first table in computer memory to identify a first level of assets protection personnel and the shortage score is applied to a second table in computer memory to identify a second level of assets protection personnel. The first level of assets protection personnel and the second level of assets protection personnel are examined to assign a level of assets protection personnel to the store.

Assets protection tools are assigned to stores through steps that include determining a shortage score for each store in a set of stores and grouping the stores into a first group if the stores have an assets protection tool and a second group if the stores do not have the assets protection tool. Identifying those stores in the first group that have a shortage score that is less than a first threshold and removing the assets protection tool from the identified stores of the first group. Identifying those stores in the second group that have a shortage score that is greater than a second threshold and adding the assets protection tool to the identified stores of the second group.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is an exemplary table showing the categorizing of incidents into categories under one embodiment.

FIG. 6 is an exemplary table showing percentage counts for a collection of stores under one embodiment.

FIG. 9 is an example of an RPN table in accordance with one embodiment.

FIG. 15 is an example table showing the prioritization of roles for metrics in accordance with one embodiment.

DETAILED DESCRIPTION

The present innovation allocates assets protection resources based on business information. Assets protection resources can include hours of assets protection personnel time, levels of assigned leadership, and tools such as product keepers, surveillance equipment and vehicles. The assets protection resources are allocated based on scores that are indicative of the likelihood of particular incidents or types of shortage occurring at particular stores in the future. In exemplary embodiments discussed below, generated scores are broken into ranges that are each assigned certain amounts of a resource. The amounts of a resource predicted by the various ranges are then combined in various ways to allocate the resource to particular stores.

Figure 1:
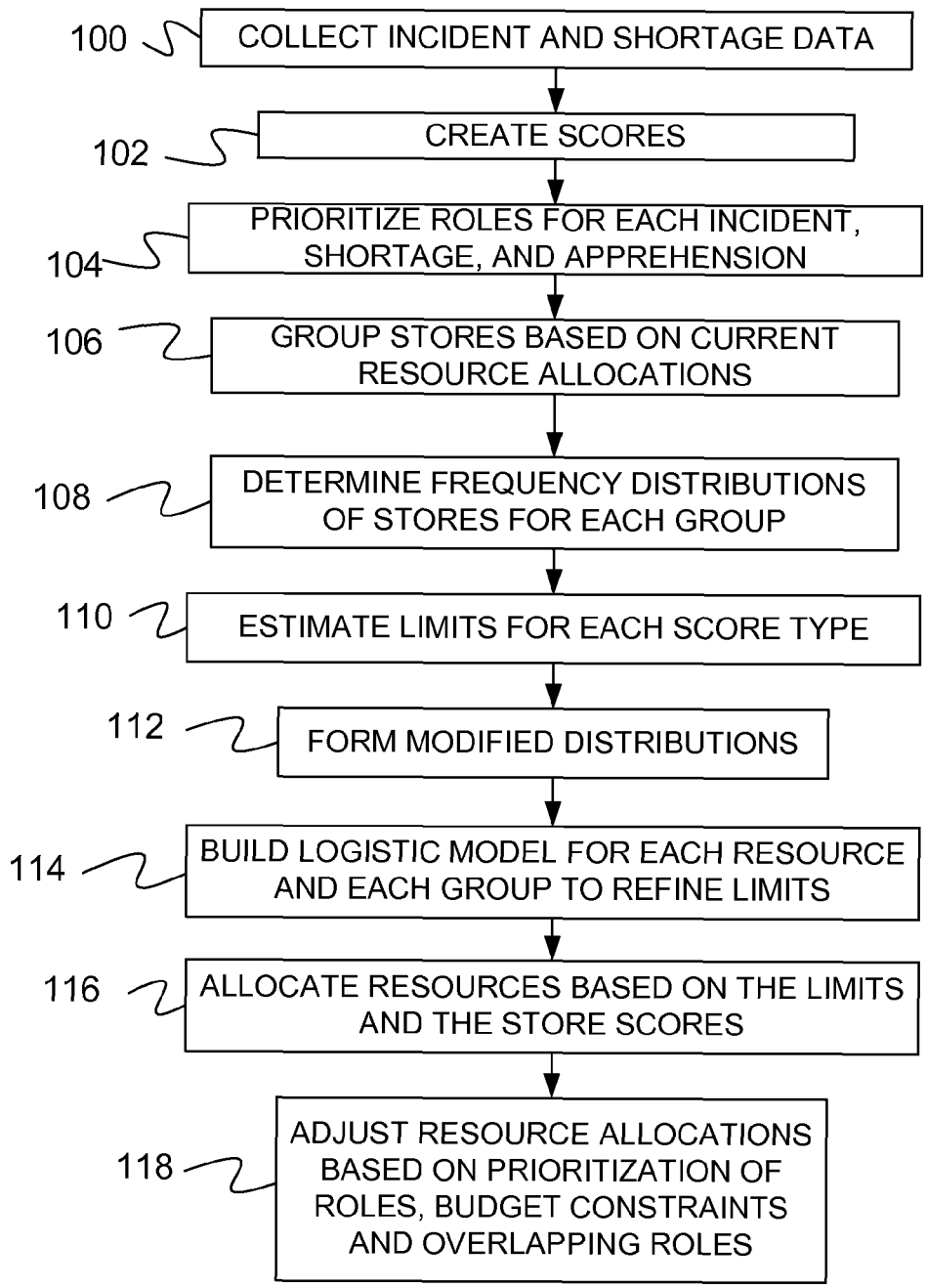
FIG. 1 is a flow diagram for allocating resources based on retail incident information.
Figure 2:
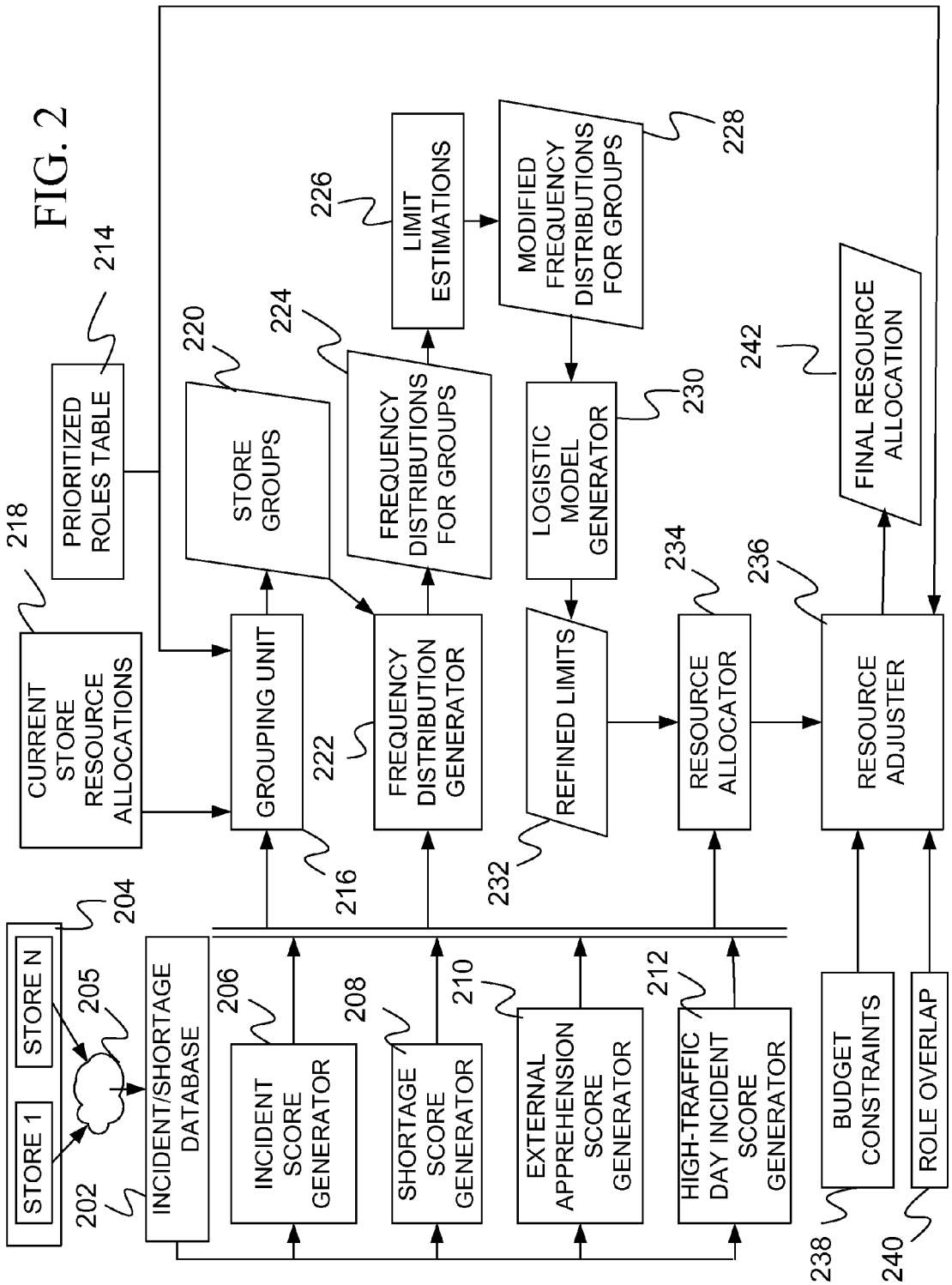
FIG. 2 is a block diagram of elements used in the flow diagram of FIG. 1.

FIG. 1 provides a flow diagram of a method of allocating resources based on business information. FIG. 2 provides a block diagram of elements used in the method of FIG. 1.

In step 100 of FIG. 1, incident data and shortage data are collected in an incident/shortage database 202. In accordance with one embodiment, the data is collected by having a collection of stores 204 submit reports of incidents and shortages across one or more computer networks 205. Incidents may include, for example, criminal events such as vandalism, assault, robbery, and threats that take place on store property, which includes the retail sales area, backrooms, employee areas and the parking area for the store. Shortage may include various ways in which products thought to be in a store are lost from the store without receiving payment. Examples of shortage include external opportunistic theft by a customer, internal opportunistic theft by an employee, external organized retail crime theft by customers, internal organized retail crime theft by employees, and point-of-sale theft in which an employee purposely does not enter a product for sale at the sales register. The number of incidents and the amount of loss due to various types of shortage may be reported by the collection of stores 204 using reporting tools that automatically store the information in incident/shortage database 202 across network(s) 205 on a store by store basis.

At step 102, scores are created from the incident data, shortage data and other data described below by score generators such as incident score generator 206, shortage score generator 208, external apprehension score generator 210 and high-traffic day incident score generator 212. In accordance with one embodiment, incident score generator 206 generates four incident scores for four different respective categories of incidents and shortage score generator 208 generates four scores for four different respective types of shortage. The operation of each of these score generators is discussed below in connection with separate flow diagrams.

Figure 3:
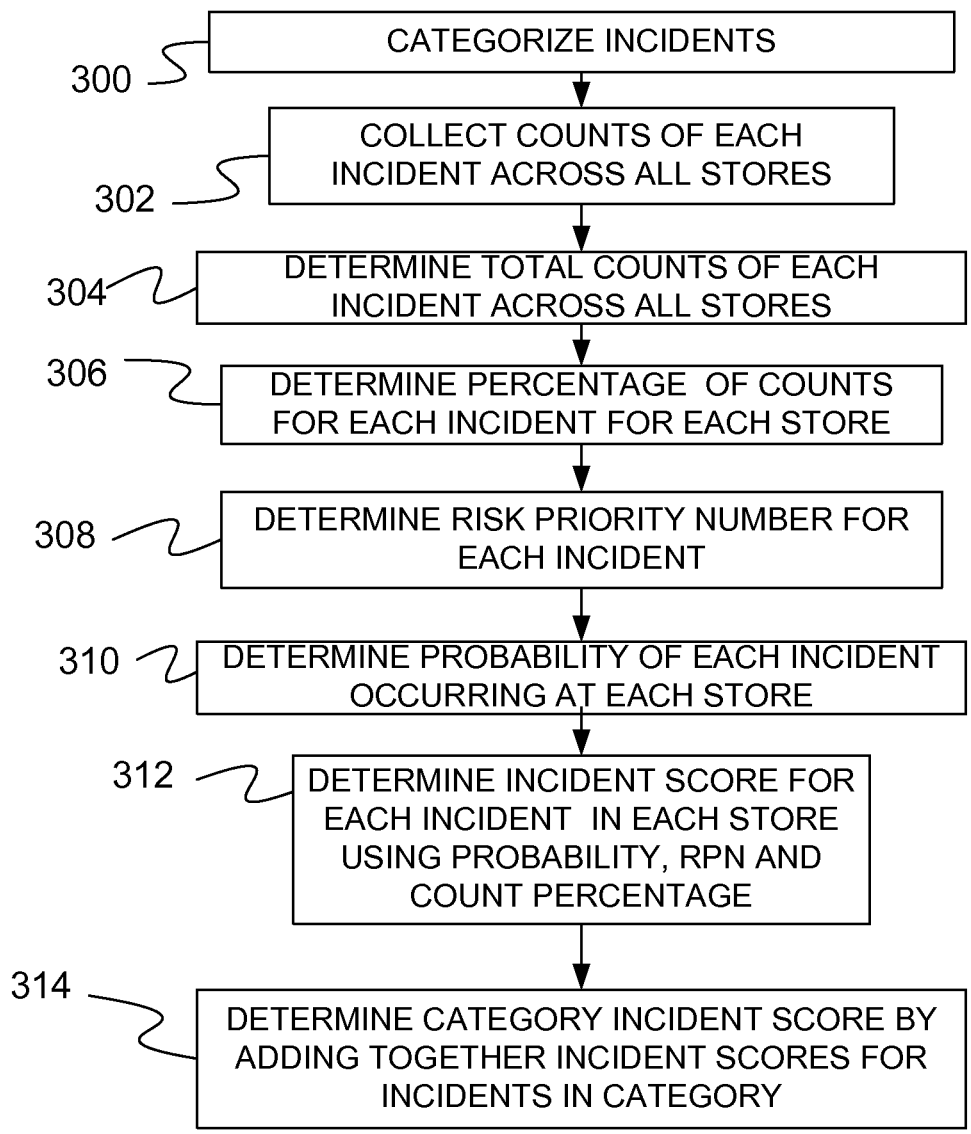
FIG. 3 is a flow diagram for generating incident scores.
Figure 4:
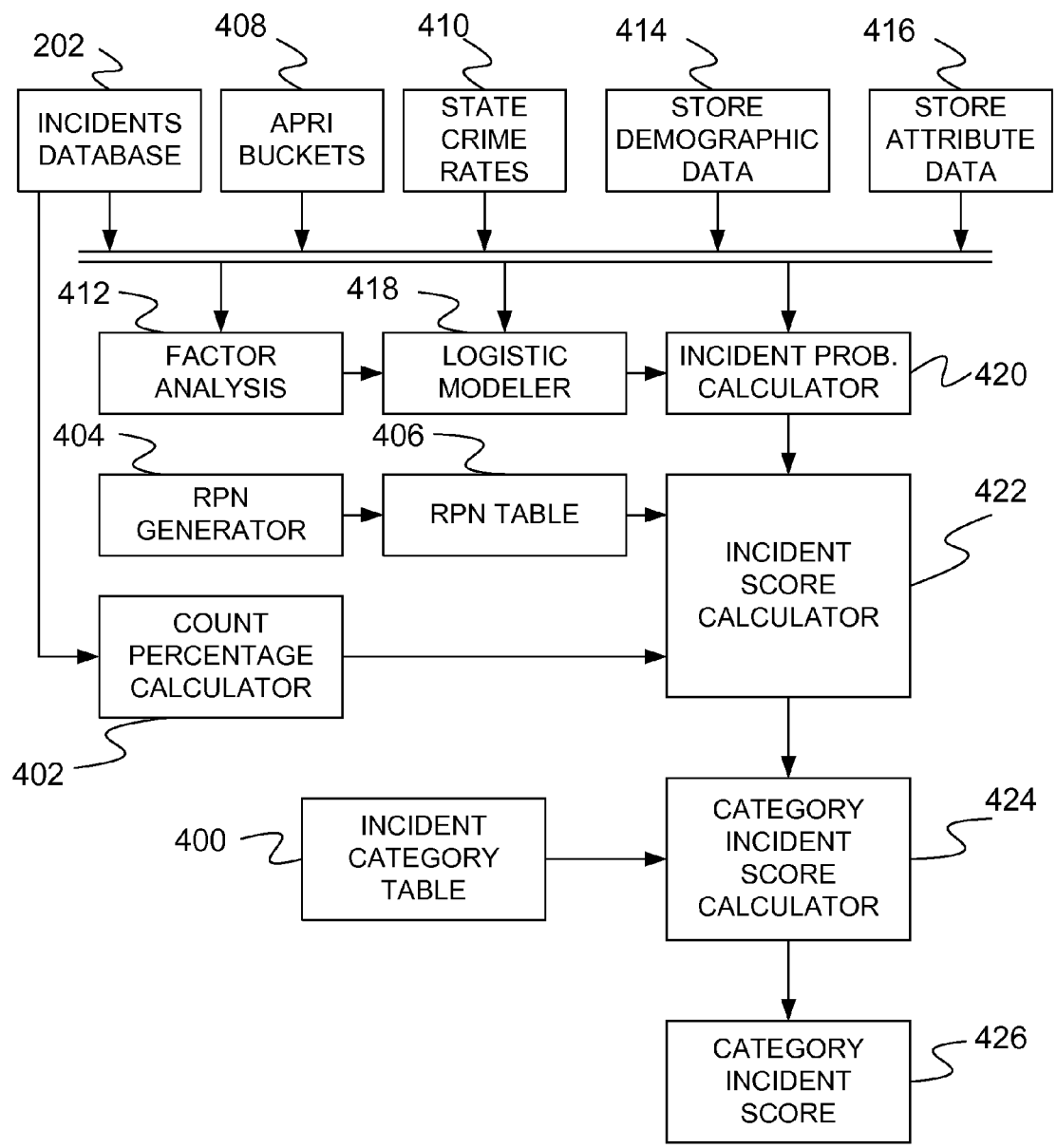
FIG. 4 is a block diagram of elements used in the method of FIG. 3.

Incident score generator 206 forms incident scores using the method described in the flow diagram of FIG. 3 and the elements shown in the block diagram of FIG. 4. In step 300 of FIG. 3, the incidents that will be used to form the incident scores are categorized in an incident category table 400. FIG. 5 provides an example of such an incident category table, which includes incident type column 502, incident category column 504 and personnel position column 506. In the table of FIG. 5, the incidents have been categorized based on the position or role of the employees who are responsible for reducing or addressing the incident types. For example, vandalism, civil unrest, fatality, and kidnapping are the responsibility of an executive manager or an investigator manager and thus are categorized together in Category 1 as indicated by column 504.

At step 302 of FIG. 3, counts of each incident listed in incident database 202 are collected for each store by a count percentage calculator 402. At step 304, count percentage calculator 402 determines the total counts of each incident across all stores. At step 306, count percentage calculator 402 determines a percentage of counts for each incident for each store by dividing the count of each incident at each store by the total count of each incident across all stores. FIG. 6 provides a table showing a hypothetical example for computing such count percentage scores. In column 600 of FIG. 6, store identifiers are listed. In the example of FIG. 6, there are six stores. Column 602 provides the number of burglary incidents for each store and column 604 provides a count percentage for each store. In row 606, a total count and a total count percentage are provided. Thus, in order to arrive at the count percentage for a store, the burglary count for the store is divided by the total count of 26 in FIG. 6. For store 1, the count percentage is computed as 5 divided by 26.

At step 308 of FIG. 3, a risk priority number (RPN) is generated for each incident by a risk priority number generator 404. This results in a risk priority number table 406. In accordance with one embodiment, a risk priority number is defined by an equation:

$$RPN = severity \times occurrence \times detection$$

In accordance with one embodiment, the severity in the equation is a severity measure that has three parts: a financial impact measure, a guest/employee impact measure, and a reputation measure. In accordance with some embodiments, the severity measure is the average of the three measures. In accordance with one embodiment, the financial impact measure, guest/employee impact measure and reputation measure are each in the range from 1-10 and are typically set by hand.

Figure 7:
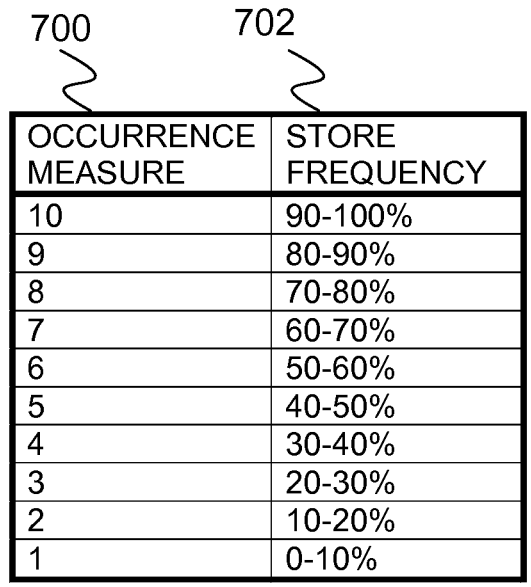
FIG. 7 is an example of an occurrence score table.

In accordance with one embodiment, the occurrence measure has a value from 1 to 10, which is set to reflect the percentage of stores that had at least one occurrence of the incident in a year. FIG. 7 provides a table showing the association between occurrence measures in column 700 and percentage ranges of stores that had at least one incident occur in a year in column 702. For example, an occurrence measure of 8 is associated with a range of 70-80% of stores having at least one occurrence of the incident in a year.

Figure 8:
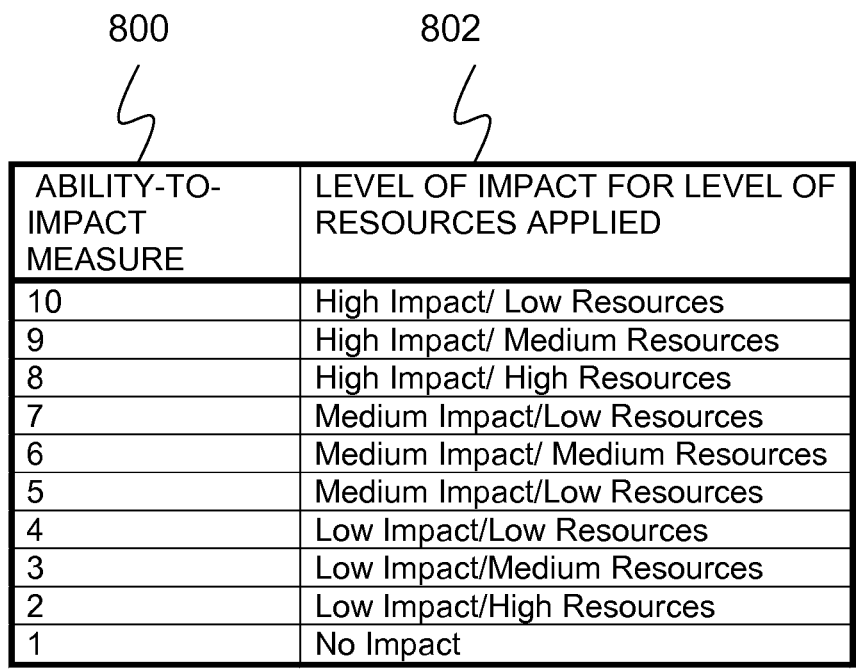
FIG. 8 is an example of an ability-to-impact table.

The detection measure, also referred to as the ability-to-impact measure, reflects the ability to impact or decrease the number of incidents by allocating resources to the store. In accordance with one embodiment, the ability-to-impact measure has values between 1 and 10. FIG. 8 provides an example of the relationship between a detection/ability-to-impact measure in column 800 and the amount of impact that can be achieved by applying various levels of resources in column 802. For example, if it is possible to achieve a high amount of impact in reducing the number of incidents by applying medium resources, the ability-to-impact measure would be 9 in FIG. 8. If there is a low ability to impact the number of incidents even when applying a high amount of resources, the ability-to-impact measure would be 2 in FIG. 8.

Using the RPN definition above, a risk priority number can be determined for each incident. FIG. 9 provides an example RPN table 900 which has a separate row for each incident type with column 902 providing the incident type, column 904 providing the financial impact measure, column 906 providing the guest/employee impact measure, column 908 providing the reputation measure, column 910 providing the severity measure, column 912 providing the occurrence measure, column 914 providing the ability to impact measure and column 916 providing the risk priority number. In general, the higher the risk priority number, the more important it is to apply resources to reduce the number of incidents.

Figure 10:
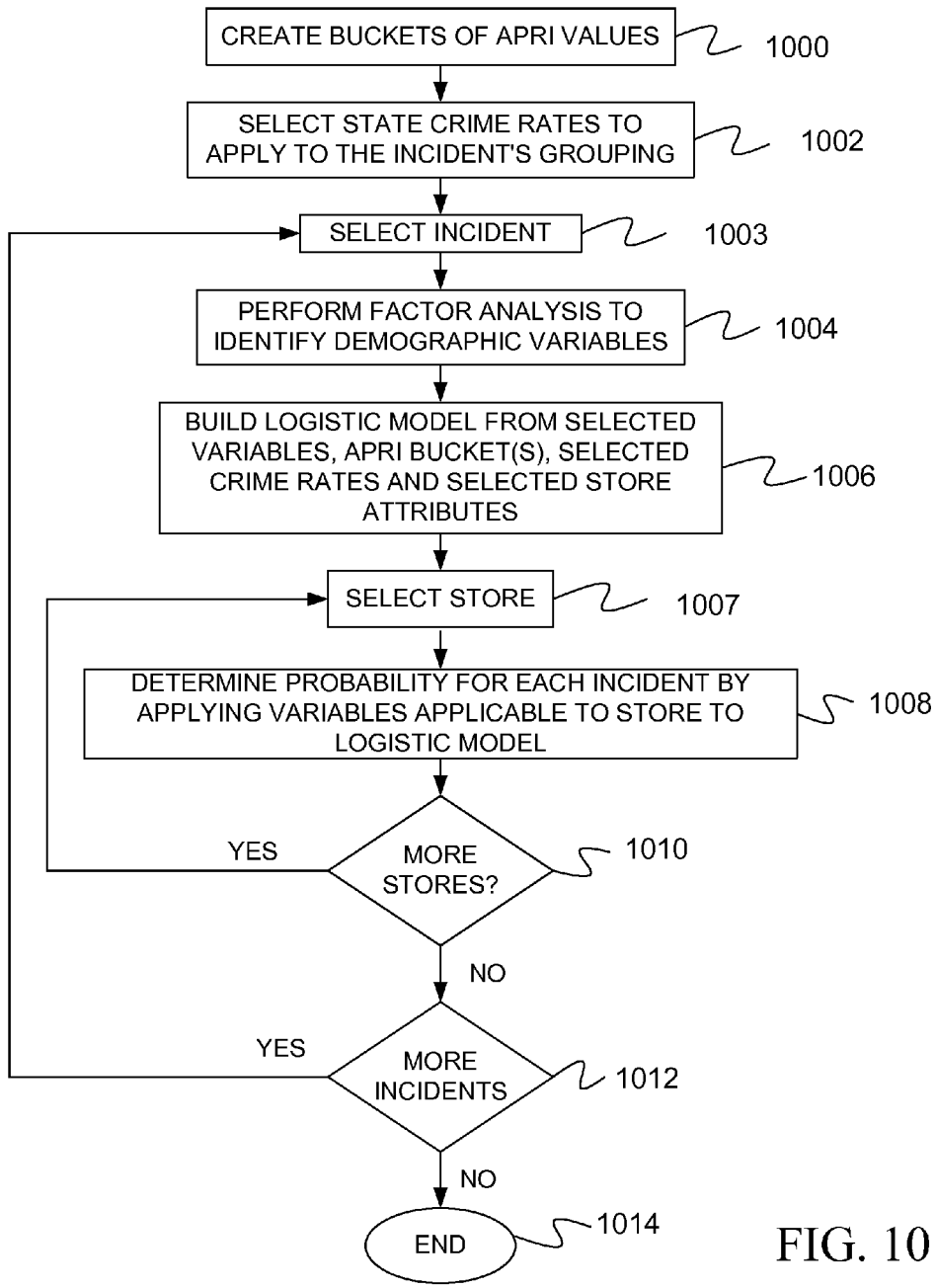
FIG. 10 is a flow diagram of a method of determining a probability of an incident in accordance with one embodiment.

Returning to FIG. 3, after determining the risk priority number, a probability of an incident occurring at a store is determined at step 310. FIG. 10 provides a flow diagram of one method for determining such probabilities. In step 1000, buckets of assets protection risk index (APRI) values 408 (FIG. 4) are created. An assets protection risk index represents the general risk environment that a store is placed within. Thus, it is a measure of the risk inherent in the neighborhood in which the store has been placed. In accordance with one embodiment, four different buckets of APRI values are created in step 1000.

At step 1002, state crime rates 410 are selected based on the state in which the store is located. Such crime rates provide the number of occurrences of different types of crimes per capita.

At step 1003, an incident is selected and at step 1004, a factor analysis is performed by factor analysis 412 to identify demographic variables in store demographic data 414 that appear to have high factor loading on the incident. Store demographic data 414 includes variables such as a population estimate for the area within a 3 mile radius of the store, a median age of the population near the store, a percentage of the population within 3 miles of the store with a college diploma, a percentage of occupied household units with no vehicle available and a percentage of college graduates in a wider radius around the store.

At step 1006, a logistic modeler 414 constructs a logistic model from the variables selected by factor analysis 412, APRI buckets 408, selected crime rates from state crime rates 410, and selected store attributes from store attribute data 416. A logistic model provides a probability of an event by fitting data to a logistic curve described as:

$$f(z) = \frac{1}{1+e^{-z}}$$

where the variable z is usually defined as $z=\beta_0+\beta_1 x_1+\beta_2 x_2+\beta_3 x_3+\ldots+\beta_k x_k$, and where each $\beta$ is a regression coefficient and each x is a respective variable. Thus, building the logistic model from the selected variables involves identifying the regression coefficients so that the logistic function accurately describes the probability of an incident given the variables.

At step 1007, a store is selected and at step 1008 an incident probability calculator 420 determines the probability for the selected incident occurring in the selected store by applying variables applicable to the store to the logistic model formed by logistic modeler 418. At step 1010, it is determined whether there are more stores to be evaluated. If there are more stores, the process returns to step 1007 and a new store is selected and step 1008 is repeated to determine the probability for the incident in the newly selected store. When there are no more stores at step 1010, the process determines if there are more incidents at step 1012. If there are more incidents, a new incident is selected by returning to step 1003 and steps 1004, 1006, 1007, 1008 and 1010 are repeated. When there are no more incidents at step 1012, the process ends at step 1014.

Once the probability of each incident occurring at each store has been determined at step 310, the process of FIG. 3 continues at step 312 where incident score calculator 422 determines an incident score for each incident in each store using the probability generated by incident probability calculator 420, the risk priority number from risk priority number table 406 and the count percentage generated by count percentage calculator 402. In accordance with one embodiment, the incident score is computed as:

incident score=(probability×RPN)+(probability× RPN×count percentage)

After an incident score has been determined for each possible incident, a category incident score is determined at step 314 by a category incident score calculator 424 for each category in incident category table 400. In accordance with one embodiment, the category incident score is the sum of all the incidents in the category. For example, for category 2 of FIG. 5, the category incident score would be formed by summing the incident score for burglary and the incident score for attempted burglary. Category incident score calculator 424 produces category incident scores 426. In accordance with some embodiments, category incident scores are not calculated for category 1 incidents because category 1 incidents are not used to allocate resources.

Figure 11:
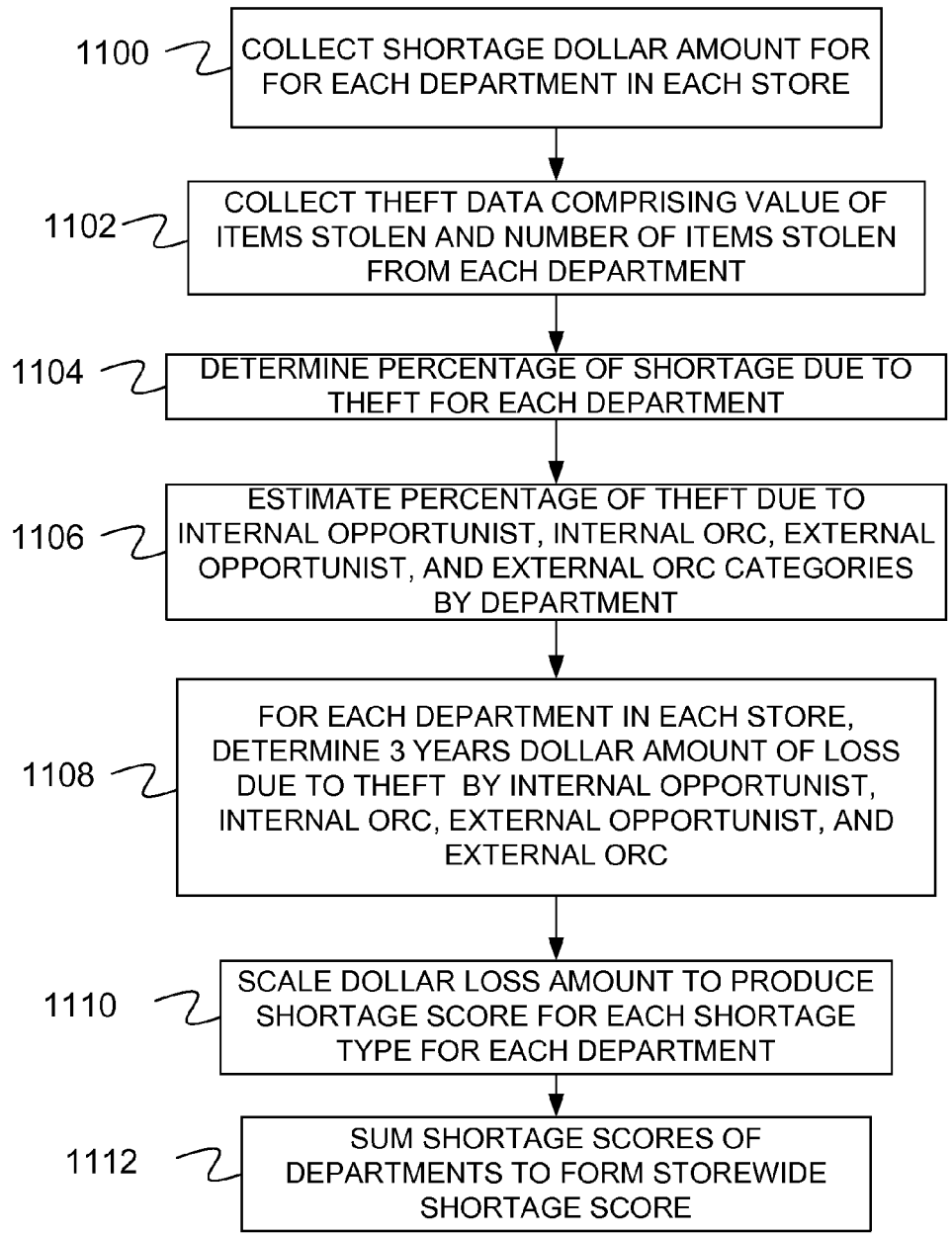
FIG. 11 is a flow diagram for computing shortage scores in accordance with one embodiment.
Figure 12:
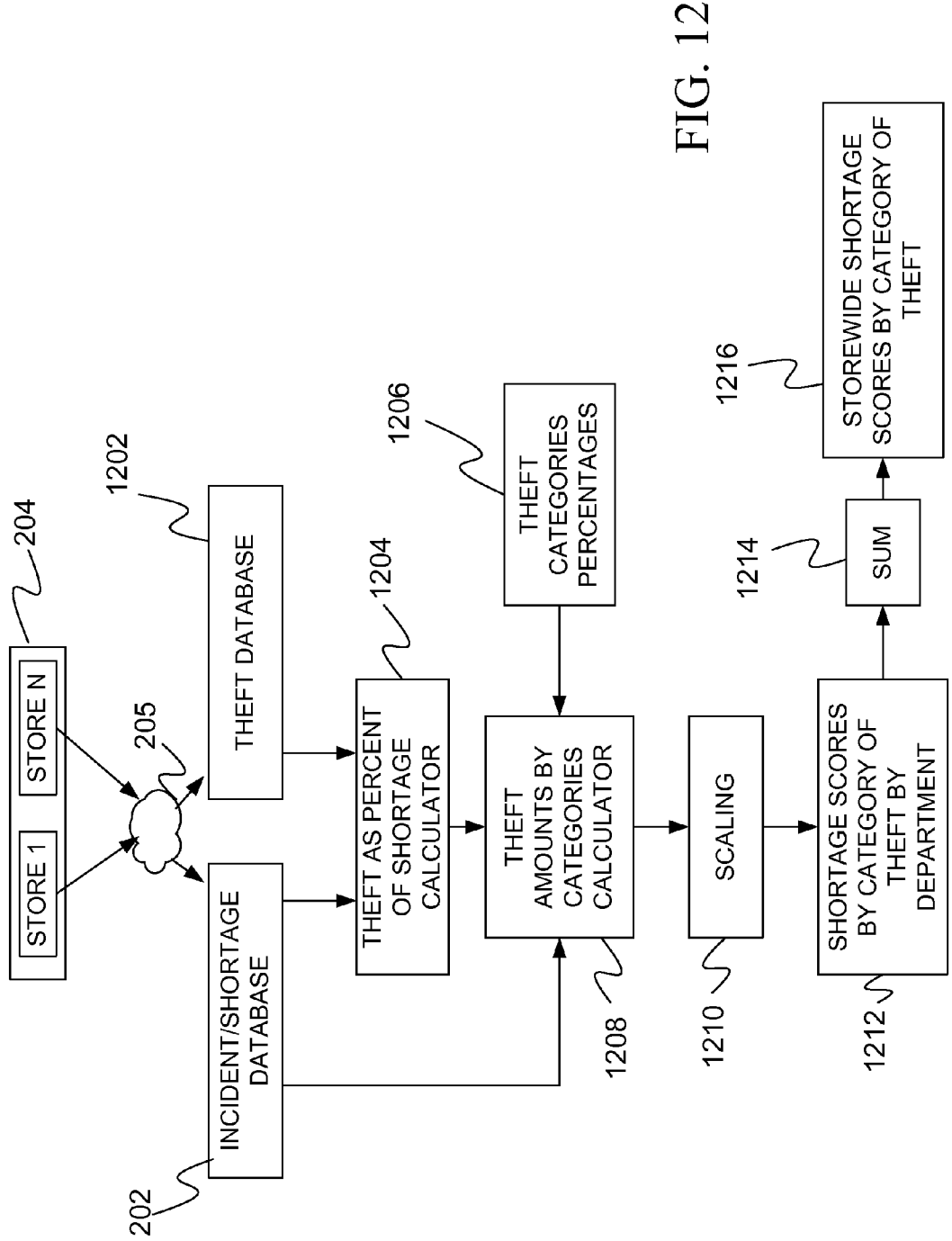
FIG. 12 is a block diagram of elements used in the method illustrated in FIG. 11.

FIG. 11 provides a flow diagram of a method of computing shortage scores for various types or categories of theft-based shortage. FIG. 12 provides a block diagram of elements used in the flow diagram of FIG. 11.

In step 1100, shortage dollar amounts for each department in each store are collected. In accordance with one embodiment, each store in the collection of stores 204 reports shortage dollar amounts for each department across a network 205. In accordance with one embodiment, the shortage dollar amounts are reported using a reporting tool that stores the shortage amounts in incident/shortage database 202. Shortage dollar amounts may be reported on a daily, weekly, or monthly basis and are determined by taking inventory of the products in each department and comparing this inventory to what is expected to be present in each department given what was shipped to the store and the sales that have been recorded. The dollar amount for the shortage is determined by multiplying the number of missing products by their respective prices.

In step 1102, theft data comprising the value of items stolen and the number of items stolen is collected for each department in each store. In accordance with one embodiment, each store in the collection of stores 204 reports the number of items known to be stolen and their values using a reporting tool that stores the theft data in a theft database 1202.

At step 1104, a theft-as-percentage-of-shortage calculator 1204 determines the percentage of the shortage that is due to theft for each department in each store. In accordance with one embodiment, this involves determining the dollar amount of all thefts in the department by multiplying the number of stolen items by their respective value. This theft dollar amount is then divided by the shortage dollar amount for the department to arrive at the percentage of the shortage that is due to theft for the department.

At step 1106, thefts are divided into types or categories and an estimate of the percentage of theft due to each category is estimated. In accordance with one embodiment, there are four types or categories of theft shortage: internal opportunist, internal organized retail crime (ORC), external opportunist, and external organized retail crime (ORC). Internal opportunist theft is theft by an employee acting alone and typically only stealing a few items. Internal ORC is theft by an employee who is working as part of a larger criminal enterprise and is stealing multiple items at multiple different times. External opportunist theft is theft by customers acting alone and typically only stealing a few items. External ORC is theft by one or more customers who are working as part of a larger criminal enterprise and are stealing multiple items at multiple different times. The estimates of the percentages of thefts due to each category of theft are stored as theft categories percentages 1206.

At step 1108, the dollar amount of loss due to each category of theft over a period of three years is determined by a calculator 1208. In accordance with embodiment, calculator 1208 determines the dollar amount of loss over the three years by first collecting the dollar amount of shortage for each department and each store for each of the three years. The dollar amounts for the three years are summed together to form a sum for each department in each store. Each sum is then multiplied by the department's theft percentage as computed by calculator 1204. Thus, if 24% of all shortage in a department is due to theft, the sum of the three years of shortage would be multiplied by 0.24 by calculator 1208 to produce a dollar amount of thefts for each department. The dollar amount of thefts for each department is then multiplied by the theft categories percentages 1206 to produce a dollar amount for each type or category of theft for each department in each store.

At step 1110, the dollar amounts for each theft category for each department in each store are scaled by a scaling unit 1210 to produce shortage scores 1212 for each theft category/shortage type. In accordance with one embodiment, the scaling value is 1/100.

At step 1112, shortage scores 1212 for each department are summed by a summing unit 1214 on a store-by-store basis to produce storewide shortage scores 1214 for each category/type of shortage for each store.

Figure 13:
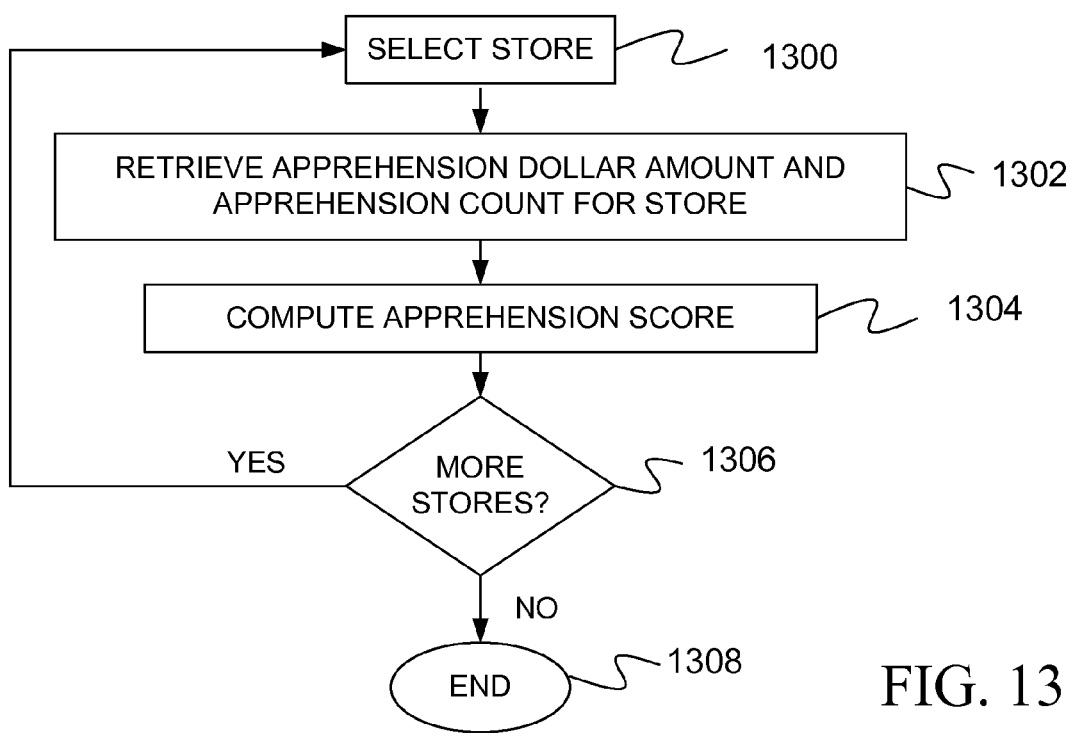
FIG. 13 is a flow diagram of a method of computing an external apprehension score in accordance with one embodiment.

FIG. 13 provides a flow diagram of a method used by external apprehension score generator 210 to compute an external apprehension score. In step 1300, a store is selected and at step 1302 an apprehension dollar amount and an apprehension count for the store are retrieved from incident database 202. The apprehension dollar amount reflects the value of goods returned to the store by apprehending a thief after they have left the store. The apprehension count reflects the number of external apprehensions that took place. The apprehension score is then computed at step 1304. In accordance with one embodiment, the apprehension score is computed as:

$$\text{apprehension score} = (0.6 \times \text{apprehension dollar amount}) + (0.4 \times \text{apprehension count})$$

At step 1306, the method determines if there are more stores. If there are more stores, the process returns to step 1300 and selects a new store before repeating steps 1302 and 1304. When there are no more stores at step 1306, the process ends at 1308.

Figure 14:
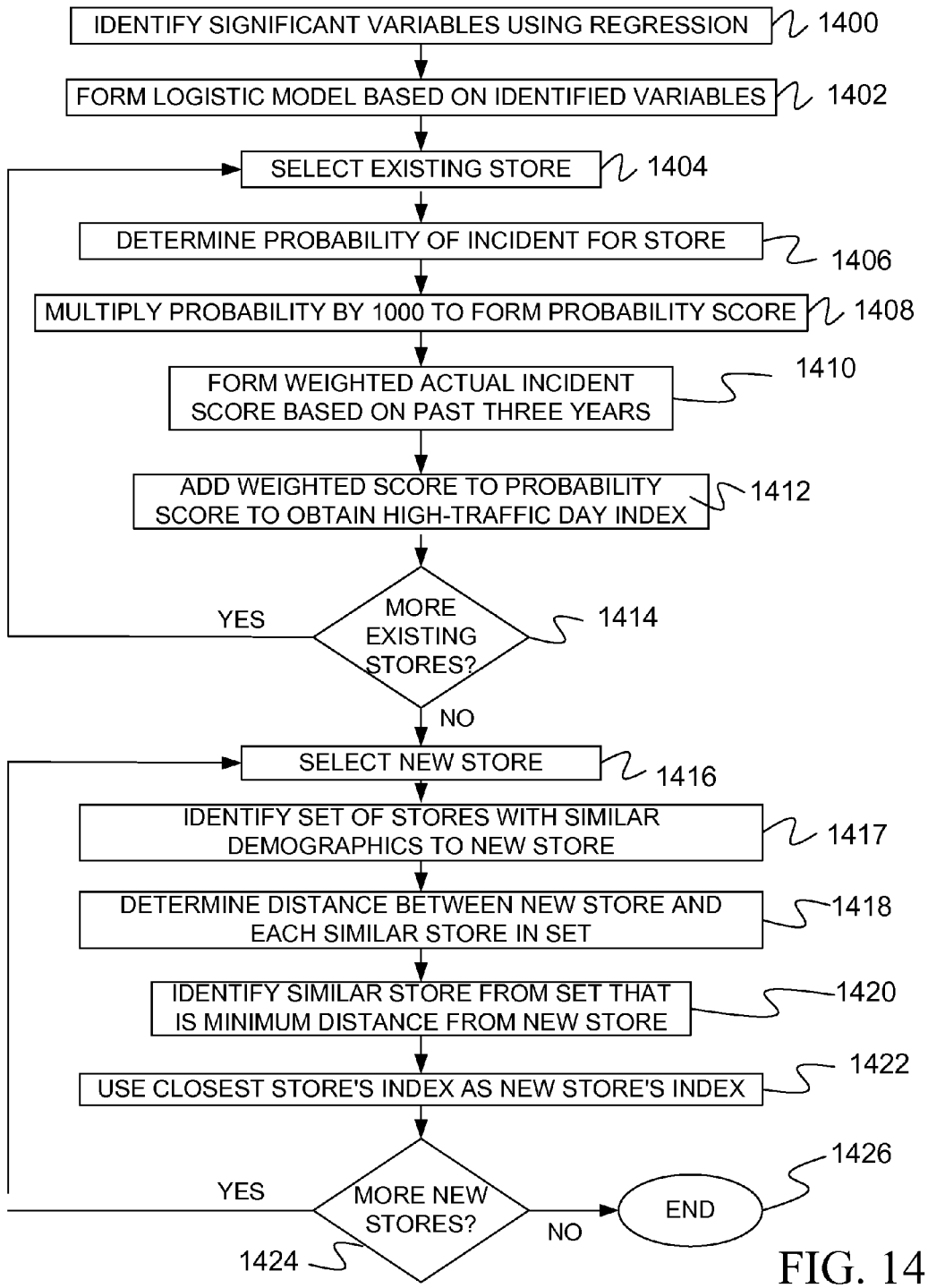
FIG. 14 is a flow diagram for a method of computing high-traffic day incident scores in accordance with one embodiment.

FIG. 14 provides a flow diagram of one method used by high-traffic day incident score generator 212 to compute a high-traffic day incident score in accordance with an exemplary embodiment. A high-traffic day incident score indicates the likelihood of an incident occurring when there is an exceptionally high volume of customer traffic at a store such as on the first Friday after Thanksgiving, commonly referred to as "Black Friday" in the United States, or other special sales events.

In step 1400 of FIG. 14, variables significant to identifying the probability of an incident on a high-traffic day are identified using regression analysis. In accordance with one embodiment, the following variables have been identified as being significant: whether the store is a multi-level store, whether the nearest competitor is at a distance greater than 5 miles, the percentage of college graduates around the store, whether the store is located in an urban environment, and the percent of working moms that visit the store. At step 1402, a logistic model is formed based on the selected significant variables. At step 1404, a store is selected and at step 1406, the probability of an incident occurring at the store on high-traffic day is determined by retrieving the values of the significant variables for the store from store attribute data 416 and store demographic data 414 and applying the values to the logistic model. At step 1408, the probabilities are multiplied by 1000 to form a probability score. At step 1410, a weighted actual incident score is generated for the selected store based on incident occurrence in the past 3 years. Under one embodiment, the weighted score is computed as:

$$\text{weighted score} = (0.2 \times \text{incidents 3 years prior}) + (0.3 \times \text{incidents 2 years prior}) + (0.5 \times \text{incidents 1 year prior})$$

At step 1412, the weighted score is added to the probability score to form the high-traffic day index for the store.

At step 1414, the method determines if there are additional existing stores. If there are additional existing stores, a next existing store is selected by returning to step 1404 and steps 1406 through 1414 are repeated. When there are no more existing stores at step 1414, a new store is selected at step 1416.

Since a new store does not have any prior incidents, its high-traffic day incident score must be determined based on its similarity to an existing store. To identify the existing store that should be selected as the proxy for the new store, a set of stores with similar demographics to the new store is identified at step 1417. The similarity between a new store and each existing store is determined along each of the significant variables. The similarity along any one variable is the difference between the value of the variable for the new store and the value of the variable for the existing store. The total similarity may be identified by taking the square-root of the sum of the squares of the differences between the values of the variables for the new store and the values of the variables for the existing store. Stores with a total similarity that is within a chosen threshold are added to the set of stores.

At step 1418, the physical distance between the new store and the existing stores in the set of similar stores is determined. At step 1420, the existing store from the set of similar stores that is a minimum distance from the new store is selected as the proxy for the new store and the proxy store's index is used as the new store's index at step 1422. At step 1424, the process determines if there are any more new stores. If there are additional new stores, the process returns to step 1416 to select a different new store and steps 1417, 1418, 1420 and 1422 are repeated. When there are no more new stores to be considered at step 1424, the process ends at step 1426.

Returning to the process of FIG. 1, after the scores have been created at step 102, roles are prioritized for incidents, shortage and apprehensions at step 104. Prioritizing roles involves identifying the level of personnel or tool that should be allocated first when attempting to reduce the occurrences of incidents and shortage at a store or when attempting to reduce the need for apprehensions at a store. FIG. 15 provides a table showing priority order for leadership roles and for non-leadership roles for various categories of incidents, various types of shortage and various types of apprehensions. In FIG. 15, incidents, shortage and apprehensions are shown in column 1500, priority order for leadership roles is shown in columns 1502 and 1504 with high priority leadership roles shown in column 1502 and low priority leadership roles shown in column 1504. Priority order for non-leadership roles is shown in columns 1506 and 1508 with high priority non-leadership roles shown in column 1506 and low priority non-leadership roles shown in column 1508. The result of step 104 is a prioritized roles table 214 of FIG. 2.

At step 106, a grouping unit 216 groups stores based on current resource allocations 218 for prioritized roles and tools as found in prioritized roles table 214. The current resource allocations can include hours of specific personnel time, levels of leadership allocated to the store, and tools used in the store. Grouping unit 216 produces store groups 220, where each store in a group has the same amount of a resource allocated to it. For example, all stores that have been allocated 40 hours of uniformed security personnel would be grouped together in a first group and all stores that have been allocated an executive leader position would be grouped in a second group. Since stores can be allocated more than one resource, a single store will be grouped into multiple different groups.

Figure 16:
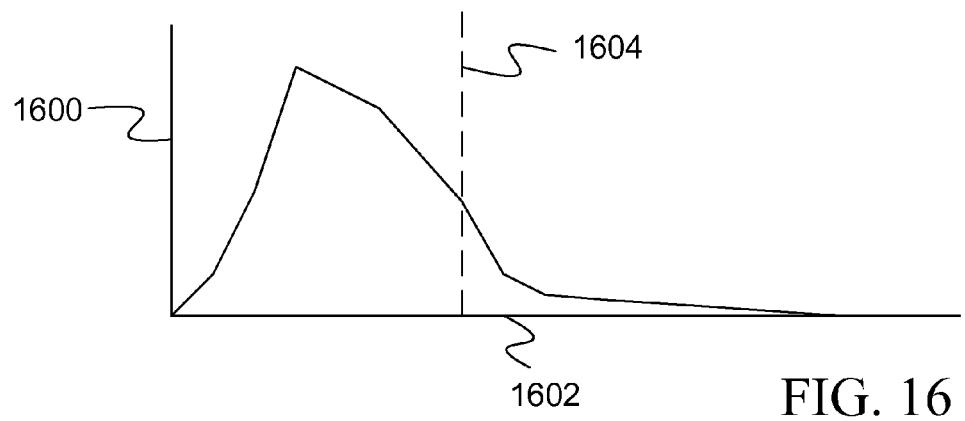
FIG. 16 is an example graph illustrating a frequency distribution of stores having a first allocation of resources.
Figure 17:
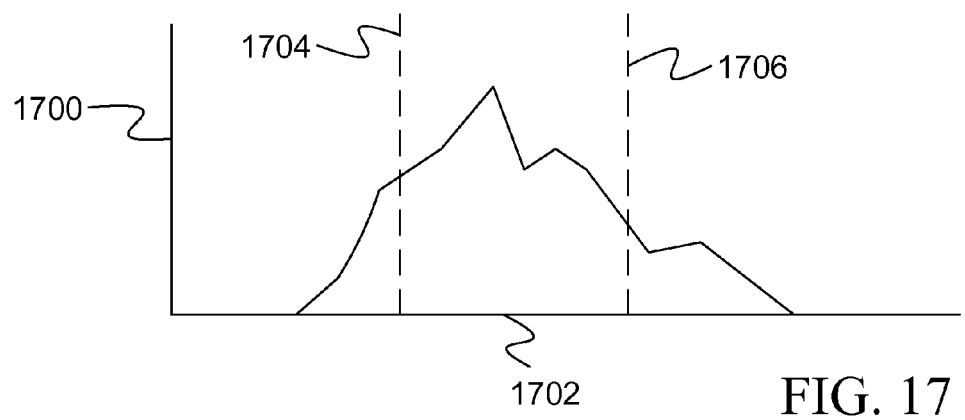
FIG. 17 is an example graph illustrating a frequency distribution of stores having a second allocation of resources.
Figure 18:
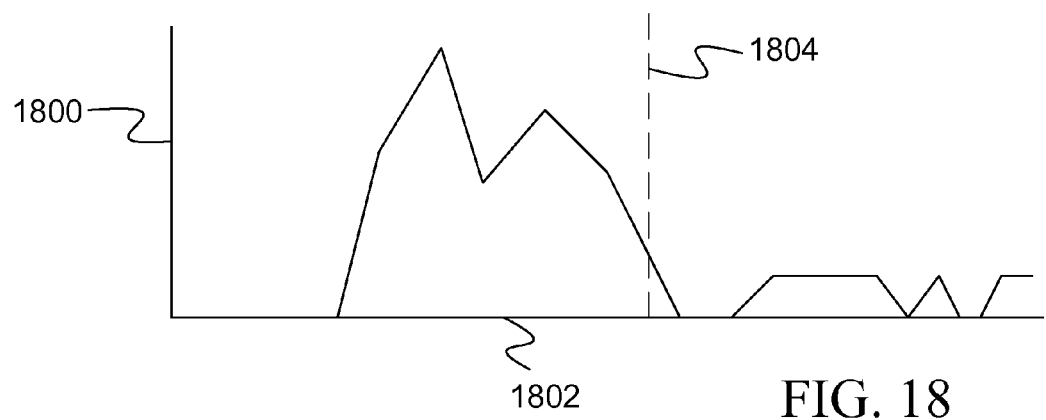
FIG. 18 is an example graph illustrating a frequency distribution of stores having a third allocation of resources.

At step 108, a frequency distribution generator 222 generates frequency distributions 224 for each group of stores in store groups 220. For example, for stores that have been grouped because they have each been allocated 40 hours of uniformed security personnel in the past, a frequency distribution for the stores would be determined for each incident category, each type of shortage, external apprehension, and high-traffic day incidents. For any one score type, the frequency distribution would show the number of stores that have each value of the score type. For example, FIG. 16 shows an example graph of a frequency distribution for stores that have been assigned zero hours of plain-clothes security personnel for the external ORC shortage score. In FIG. 16, the number of stores is shown on a vertical axis 1600 and the external ORC scores are shown on horizontal axis 1602. Similarly, FIG. 17 shows an example graph of a frequency distribution for stores that have been previously assigned 40 hours of plain clothes security personnel with the number of stores shown on vertical axis 1700 and the external ORC scores shown on horizontal axis 1702. FIG. 18 shows an example graph of a frequency distribution for stores that have been assigned 80 hours of plain-clothes security personnel with the number of stores shown along vertical axis 1800 and the external ORC scores shown along horizontal axis 1802. Similar frequency distributions would be generated for other score types for these groups of stores.

At step 110, limits for each score type are estimated based on frequency distributions of stores in each grouping to form limit estimations 226. In general, these limits are estimated to be roughly one standard deviation from the mean of the frequency distribution. Thus, in FIG. 16, limit estimate 1604 is roughly one standard deviation greater than the mean. In FIG. 17, limit estimate 1704 is roughly one standard deviation less than the mean and limit estimate 1706 is roughly one standard deviation greater than the mean of the frequency distribution shown in FIG. 17. In FIG. 18, limit 1804 is roughly one standard deviation less than the mean. Other techniques may be used for estimating these limits.

At step 112, modified distributions are formed by shifting stores that are above an upper limit to the group of stores that have been allocated more of this type of resource and by shifting stores that are less than a lower limit to the group of stores that have been allocated fewer resources. For example, in FIG. 16, stores above limit 1604 are shifted to be in the group represented by the frequency distribution of FIG. 17 while stores that are less than the limit 1704 in FIG. 17 are shifted to be in the group represented by the frequency distribution of FIG. 16. Similarly, stores that are greater than upper limit 1706 in FIG. 17 are shifted to the group represented by the frequency distribution of FIG. 18 while the stores with a score that is less than the lower limit 1804 of FIG. 18 are shifted to the group represented by the frequency distribution of FIG. 17. This results in modified groups of stores.

At step 114 of FIG. 1, logistic models are generated by logistic model generator 230 for each resource and for each modified group of stores. These logistic models are then used to refine the limits established for each group of stores. Specifically, for each logistic model that is constructed, the mean of the frequency distribution represented by the logistic models and the standard deviation of the frequency distribution of the stores is determined. The limits are then reset at one standard deviation from the mean. For store groups representing the lowest resource allocation, only an upper limit is set at one standard deviation above the mean. For store frequency distributions representing the greatest allocation of a resource, only a single lower limit is set at one standard deviation below the mean. For all other frequency distributions, both a lower limit and an upper limit are set with the lower limit being one standard deviation below the mean and the upper limit being one standard deviation above the mean. Under some embodiments, the limit estimation step 226 may be skipped and the limits may be identified directly using step 230.

In accordance with one embodiment, a further step is performed to align the limits of neighboring distributions. Distributions are considered to be neighboring when there are no stores with an amount of an allocated resource that is between the amounts of the resource allocated to the two neighboring distributions. For example, FIG. 17 is a neighboring distribution of FIG. 18 because there are no stores that have been allocated a number of hours of plain-clothes security personnel time that is between the allocation of 40 hours of plain-clothes security time in FIG. 17 and the allocation of 80 hours of plain clothes security time in FIG. 18. For such neighboring distributions, the upper limit of the lower resource allocation can be aligned with the lower limit of the upper resource allocation. In accordance with some embodiments, the limits are aligned by shifting both limits to a score that is midway between the two limits.

The outputs of logistic model generator 230 are refined limit estimates 232, which define ranges of scores for resource allocation levels. For example, the limits of FIG. 17 describe the ranges of external ORC scores that are associated with an allocation of 40 hours of plain-clothes security personnel time.

At step 116 of FIG. 1, a resource allocator 234 allocates resources based on the limits established in step 114. Resource allocator 234 allocates the resources based on the scores calculated for each store and the ranges defined by the refined limits 232.

Figure 19:
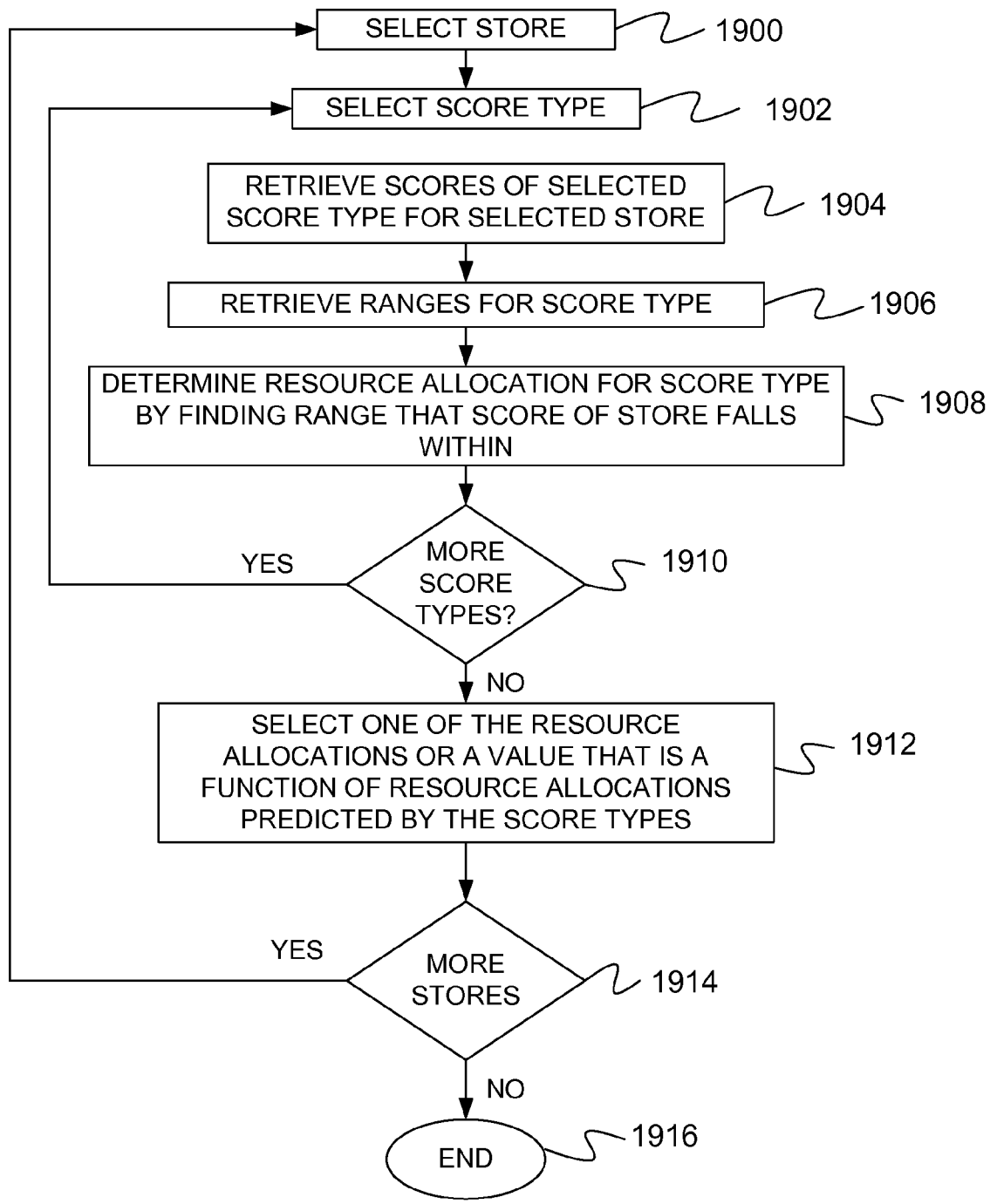
FIG. 19 is a flow diagram of a method of allocating resources based on incident scores in accordance with one embodiment.

FIG. 19 provides a flow diagram of a first method of allocating resources that is based on two different incident scores. In step 1900 of FIG. 9, a store is selected and in step 1902 a type of incident score is selected. A score for the selected type of incident is retrieved at step 1904. Ranges for the type of incident score are then retrieved at step 1906. Examples of such ranges are shown in FIG. 20 for category 3 incident scores and uniformed personnel security hours.

Figure 20:
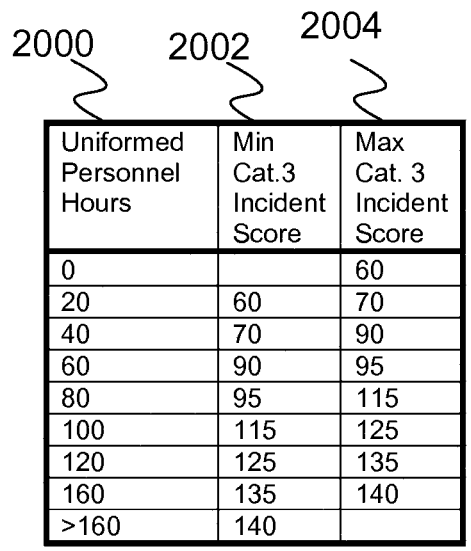
FIG. 20 is an example of a range table for a first incident score.

In FIG. 20, column 2000 includes the number of uniformed security personnel hours that are being allocated, column 2002 provides the minimum category 3 incident score for the range and column 2004 provides the maximum category 3 incident score for the range. Thus, in FIG. 20, for a resource allocation of 60 hours of uniformed security personnel time is associated with a score between a minimum of 90 and a maximum of 95.

Figure 21:
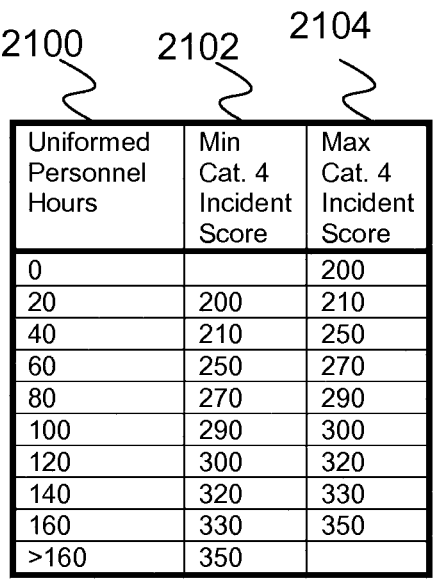
FIG. 21 is an example of a range table for a second incident score.

At step 1908, the resource allocation is determined for the type of incident score by identifying the range that the generated score of the store falls within. For example, if the category 3 incident score of the selected store is 120, the resource allocation hours from FIG. 21 would be 100 hours of uniformed security personnel time. Thus, step 1908 involves retrieving an associated number of hours of security personnel time. After determining the resource allocation for the selected score type, the method determines if there are more score types at step 1910. If there are more score types, the process returns to step 1902 to select the next score type and steps 1904, 1906, 1908 are repeated. When retrieving the ranges for the newly selected score type at step 1906, ranges such as those shown in FIG. 21 for category 4 incident scores may be used. In FIG. 21, column 2100 includes uniformed security personnel time, column 2102 provides the minimum category 4 incident score and column 2104 provides the maximum category 4 incident score.

When there are no more score types at step 1910, a resource allocation value is assigned to the store by a processor either selecting one of the resource allocations predicted by the score types at step 1908 or by selecting a value that is a function of the resource allocations predicted by the score types. In accordance with one embodiment, if the hours predicted for category 4 incidents is less than twice the hours predicted for category 3 incidents and if the number of hours predicted by the category 3 incidents is greater than zero, then the number of hours predicted from the category 3 incident score is selected. If the number of hours predicted by the category 3 incident score is equal to zero, then the number of hours predicted for the category 4 incidents is used. If the number of hours predicted for the category 4 incident score is equal or greater than twice what is predicted for the category 3 incident score, then the number of hours to allocate is equal to the number of hours predicted for the category 4 incident score minus the number of hours predicted for the category 3 incident score. In accordance with a further embodiment, a minimum number of hours, such as 100 hours of uniformed security personnel time may be assigned to all stores that have one entry/exit point.

At step 1914, resource allocator 234 determines if there are more stores. If there are more stores, the process returns to step 1900 to select a new store and steps 1902 through 1912 are repeated for the new store. When there are no more stores at step 1914, the process ends at step 1916.

Figure 22:
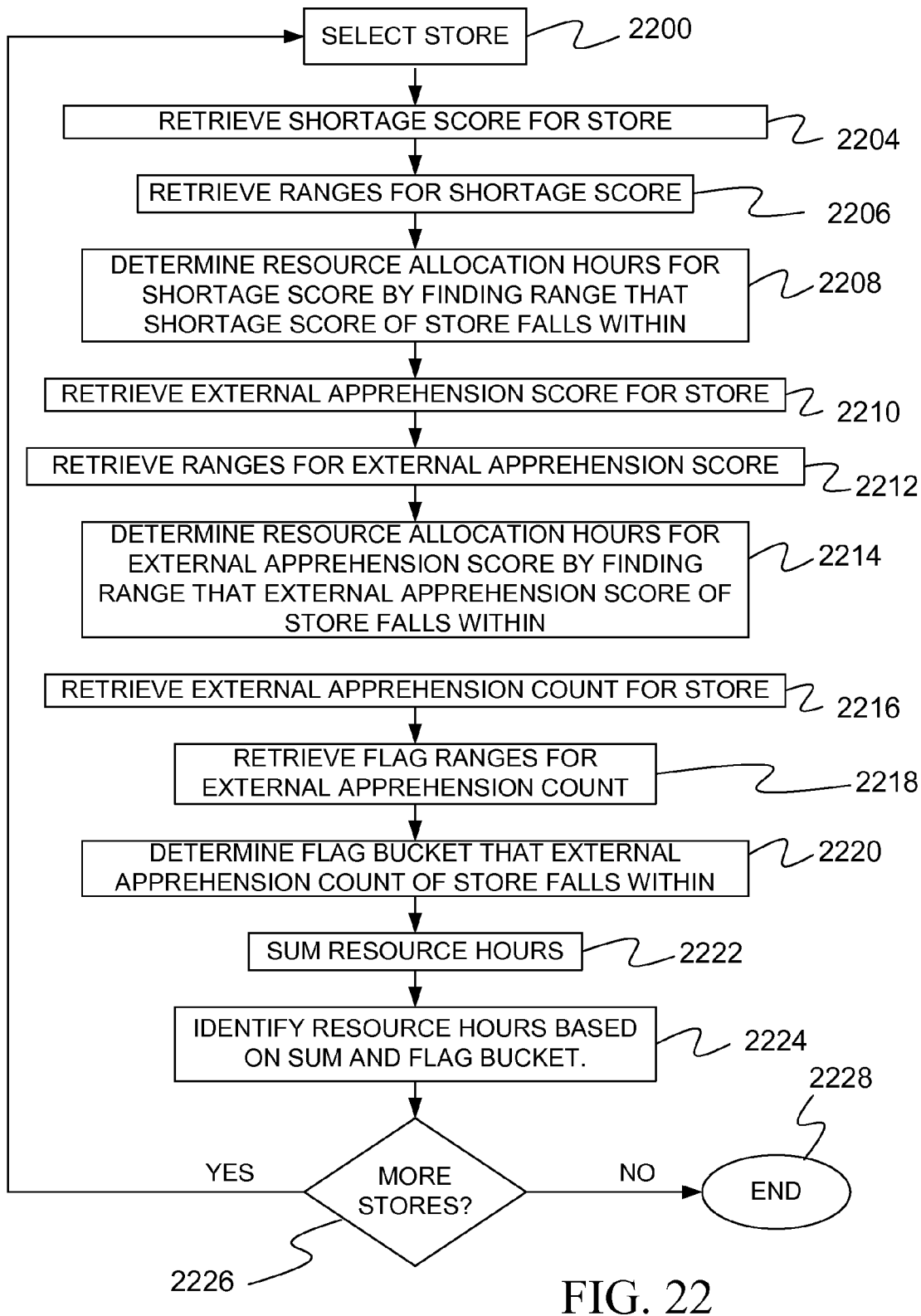
FIG. 22 is a flow diagram of a method of allocating resources based on a shortage score and apprehension score in accordance with one embodiment.
Figure 23:
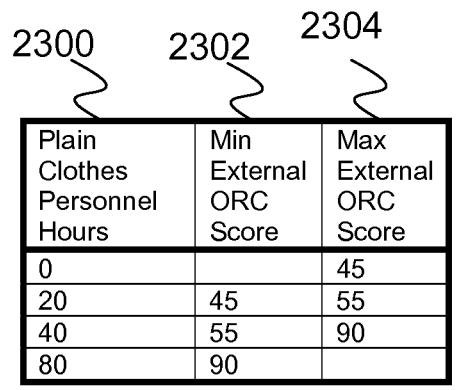
FIG. 23 is an example of a range table for a shortage score.

FIG. 22 provides a flow diagram of an alternative method of allocating resources using a combination of a shortage score and an apprehension score. In step 2200 a store is selected and at step 2204, a type of shortage score for the store is selected and is retrieved. In accordance with one embodiment, the retrieved shortage score is an external ORC score. At step 2206, the ranges for the selected shortage score are retrieved. An example of ranges of shortage scores are shown in FIG. 23 where column 2300 provides a number of hours of plain-clothes security personnel, column 2302 provides the minimum external ORC score for each allocation of hours and column 2304 provides the maximum external ORC score for each allocation of hours. For example, an allocation of 20 plain clothes security hours is associated with a minimum external ORC score of 45 and a maximum external ORC score of 55. At step 2208, the resource allocation hours predicted by the shortage score of the store is determined by finding the range that the shortage score of the store falls within.

Figure 24:
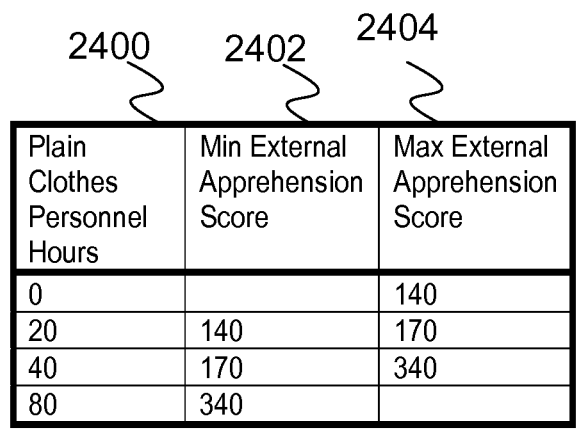
FIG. 24 is an example of a range table for external apprehension scores.

At step 2210, an external apprehension score for the store is retrieved and at step 2212 the ranges for the external apprehension score are retrieved. FIG. 24 provides an example of ranges of an external apprehension score where the ranges are shown in a table with column 2400 providing the allocation of hours of plain-clothes security personnel time, column 2402 providing a minimum external apprehension score and column 2404 providing a maximum external apprehension score for each allocation of hours. At step 2214, the resource allocation predicted by the external apprehension score is determined by finding the range of external apprehension scores that the store's score falls within.

Figure 25:
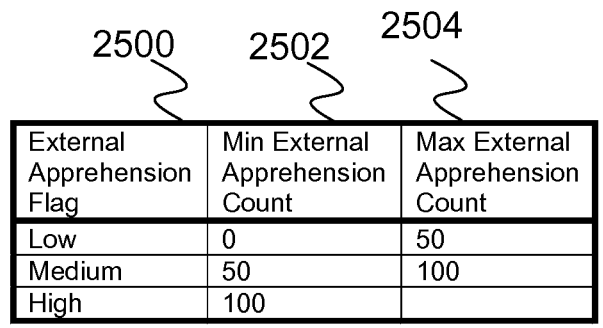
FIG. 25 is an example of flag ranges for apprehension counts.

At step 2216, the external apprehension count of the store is retrieved and at step 2218, a flag range for apprehension counts is retrieved. FIG. 25 provides an example of external apprehension flag ranges with column 2500 providing flag values, column 2502 providing minimum external apprehension counts, and column 2504 providing maximum external apprehension counts. For example, external apprehension counts between a minimum of 50 and a maximum of 100 are associated with an external apprehension count flag of "medium." At step 2220, resource allocator 234 determines which flag bucket the external apprehension count of the selected store falls within.

At step 2222, the resource hours determined in steps 2208 and 2214 are summed together and at step 2224 the resource hours for the plain clothes security personnel are determined by using the sum of resource hours and the flag. In one particular embodiment, the sum of hours is compared to a threshold of 120 hours. If the sum of the hours is greater than 120 hours, then the store is assigned 80 hours of plain clothes security personnel time. If the sum of the hours is greater than 40 hours and less than 120 hours and the external apprehension count flag is not low, the store is assigned 40 hours of plain clothes security personnel time. For all other stores, the plain clothes security personnel time will be set to zero. At step 2226, the method determines if there are more stores. If there are more stores, the process returns to step 2200 and steps 2204 through 2224 are repeated. If there are no more stores, the process ends at 2228.

Figure 26:
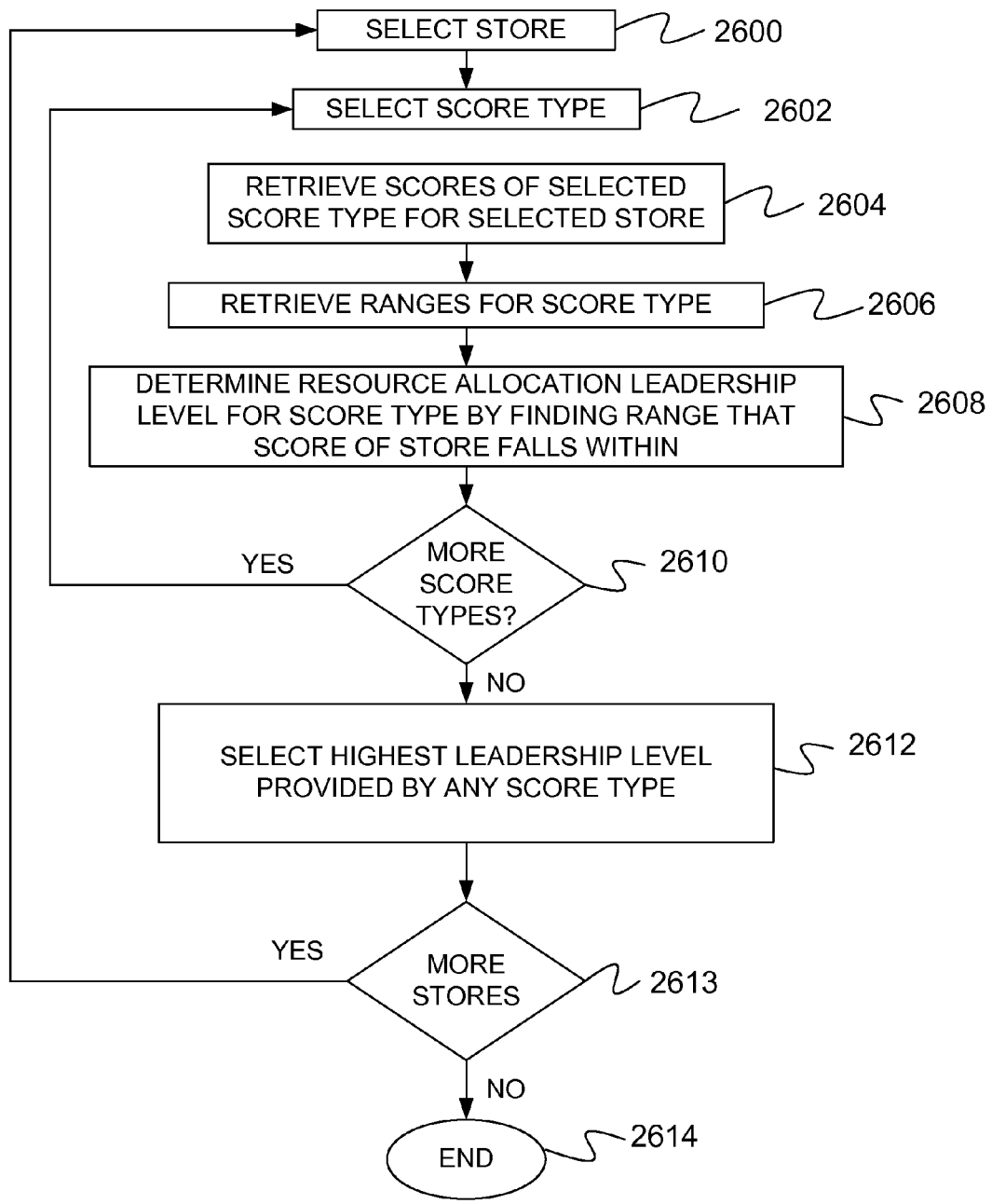
FIG. 26 is a flow diagram of a method of allocating leadership levels based on incident scores and shortage scores.
Figure 27:
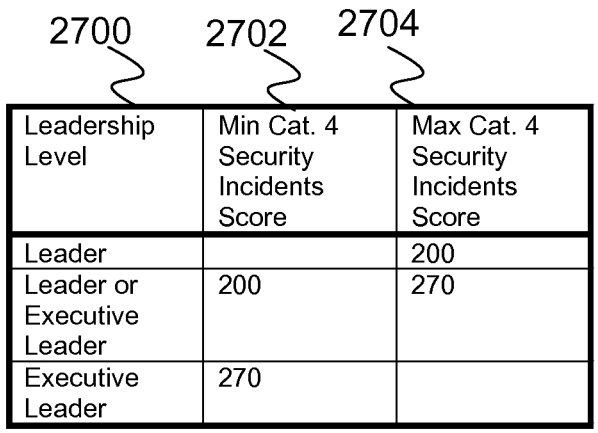
FIGS. 27-30 are examples of range tables for leadership levels for four different incident/shortage scores.
Figure 28:
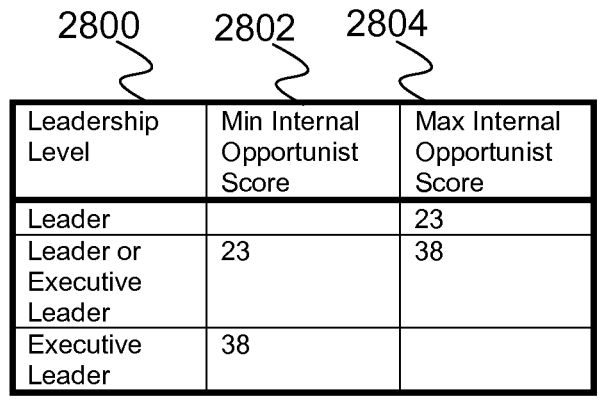
Figure 29:
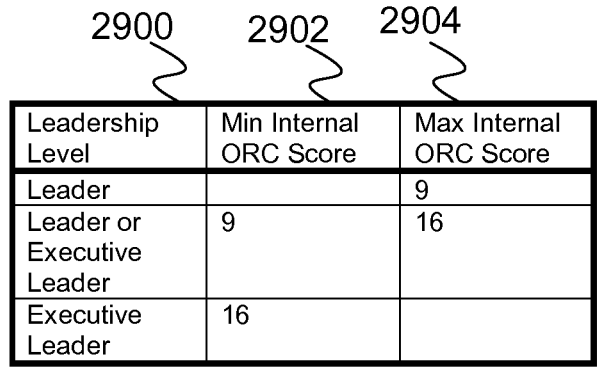
Figure 30:
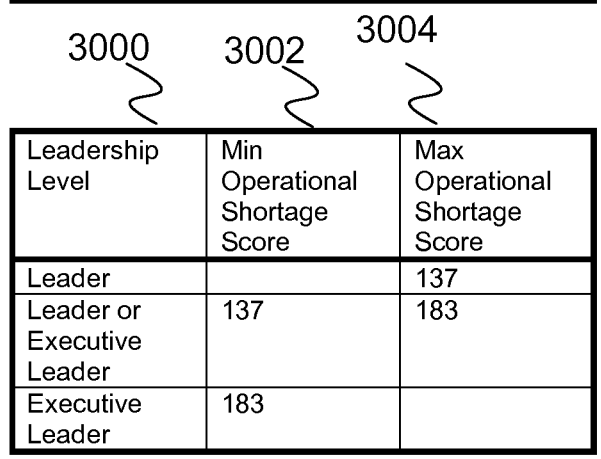

FIG. 26 provides a flow diagram of a method of allocating leadership levels based on incident scores and shortage scores. At step 2600, a store is selected. At step 2602 a score type is selected. Under one embodiment, four separate score types are used to allocate leadership levels. At step 2604, a score for the selected score type and for the selected store is retrieved. At step 2606, the ranges for the selected score are retrieved. Examples of such ranges for a category 4 incident score, an internal opportunist score, an internal ORC score, and an operational shortage score are shown in FIGS. 27, 28, 29 and 30, respectively. In FIG. 27, leadership levels are shown in column 2700, minimum category 4 incident scores are shown in column 2702 and maximum category 4 incident scores are shown in column 2704. In FIG. 28, leadership levels are shown in column 2800, minimum internal opportunist shortage scores are shown in column 2802 and maximum internal opportunist shortage scores are shown in column 2804. In FIG. 29, leadership levels are shown in column 2900, minimum internal ORC shortage scores are shown in column 2902 and maximum internal ORC shortage scores are shown in column 2904. In FIG. 30, leadership levels are shown in column 3000, minimum operational shortage scores are shown in column 3002 and maximum operational shortage scores are shown in column 3004.

At step 2608, resource allocator 234 determines the leadership level for the selected score by finding the range that the score of the store falls within. At step 2610 resource allocator 234 determines if there are more score types. If there are more score types, the process returns to step 2602 to select another score type. This process repeats until all of the score types of FIGS. 27-30 have been used to identify a leadership level. When there are no more score types, the process continues at step 2612 where the highest leadership level provided by any of the score types is identified as the leadership level to be allocated to the store. In accordance with one embodiment, the determination of which leadership level is highest is made based on the positions of the leadership levels in a hierarchical organization chart. For example, if one of the score types provides a leadership level of executive team leader while the remaining score types provide a leadership level of team leader, and an executive team leader is positioned higher in a hierarchical organization chart than a team leader, the store will be allocated an executive team leader instead of a team leader. At step 2614, resource allocator 234 determines if there are more stores. If there are more stores, the process returns to step 2600. If there are no more stores, the process ends at step 2616.

Figure 31:
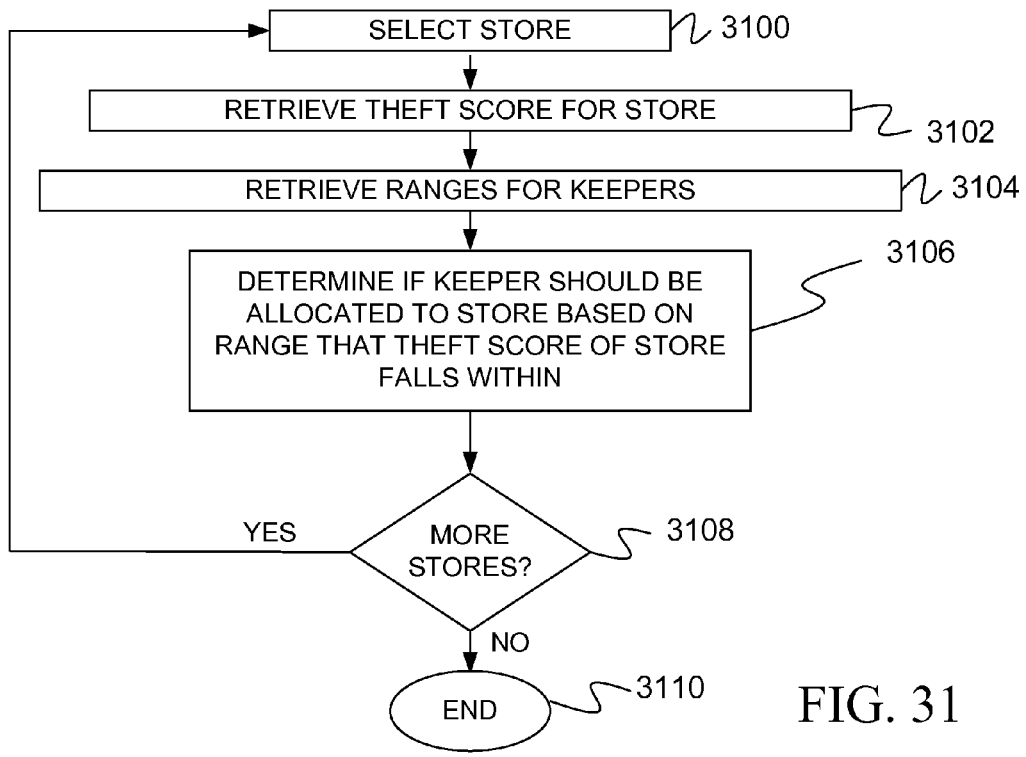
FIG. 31 is a flow diagram of a method of allocating keepers in accordance with one embodiment.

FIG. 31 provides a method for allocating an assets protection tool known as a keeper. Keepers are physical structures that are used to limit customer's access to products so as to make it more difficult for customers to obtain a large number of the products without their action being brought to the attention of an employee.

In FIG. 31, a store is selected at step 3100 and a theft score for the store is retrieved at step 3102. In this embodiment, a theft score comprises the sum of all shortage scores associated with theft. At step 3104, ranges for using keepers are retrieved. In general, there are two ranges, one range for having keepers, and one range for not having keepers, which are separated by a threshold theft score. At step 3106, resource allocator 234 determines if a keeper should be used in a store by comparing the theft score to the threshold theft score and thereby determining which range the theft score of the store falls within. At step 3108, resource allocator 234 determines if there are more stores to be considered. If there are more stores, the process returns to step 3100 to select another store. When there are no more stores at step 3108, the process ends at 3110.

Figure 32:
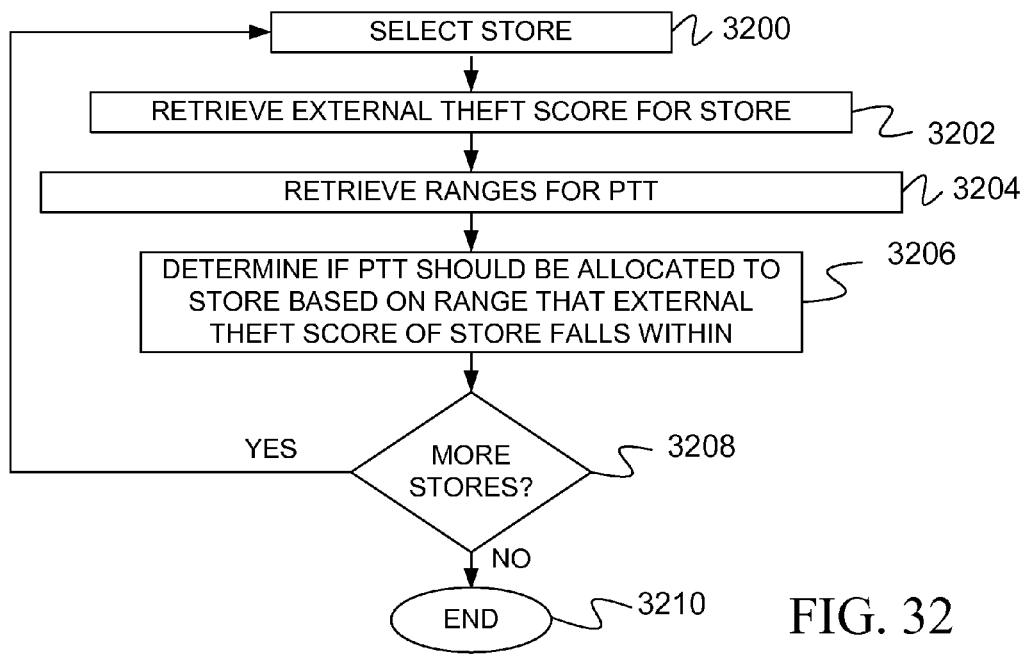
FIG. 32 is a flow diagram of a method of allocating PTT in accordance with one embodiment.

FIG. 32 provides a flow diagram of a method of allocating an assets protection tool known as PTT. In step 3200, a store is selected and at step 3202, external theft scores for the store are retrieved. Under one embodiment, external theft scores include an external opportunist score and an external ORC score. At step 3204, the ranges of the external theft scores for PTT are retrieved. Under one embodiment, there are two ranges for each score with each range being separate by a threshold score. At step 3206, resource allocator 234 determines if a PTT should be assigned to a store based on the ranges of external theft scores that the external theft scores of the store fall within. In accordance with one embodiment, the theft scores for the store must both be in the ranges associated with assigning a PTT to a store in order to have a PTT assigned to the store. If either one of the external theft scores is in the range associated with not assigning a PTT to the store, the PTT is not assigned to the store. At step 3208, resource allocator 234 determines if there are more stores. If there are more stores, the process returns to step 3200 to select a different store. Steps 3202 through 3206 are then repeated. When there are no more stores at step 3208, the process ends at step 3210.

Figure 33:
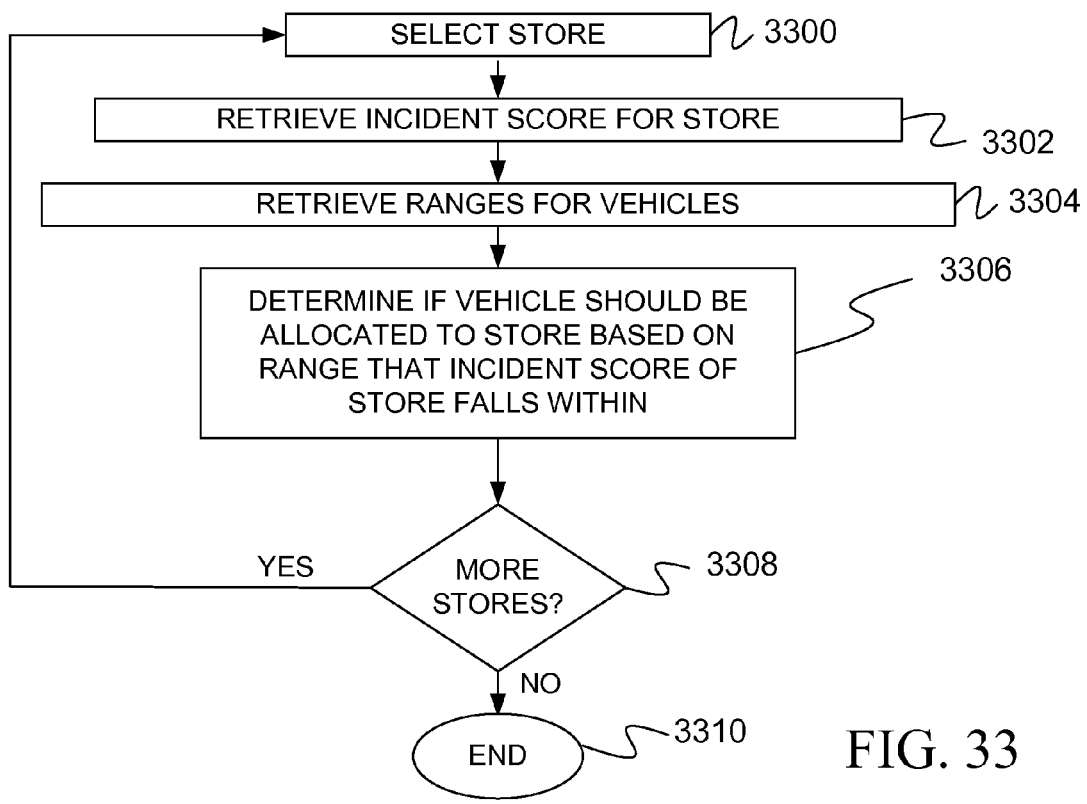
FIG. 33 is a flow diagram of a method of allocating vehicles in accordance with one embodiment.

FIG. 33 provides a flow diagram of a method for allocating assets protection tools in the form of vehicles, such as carts and Segway® personal transports, to stores. At step 3300, a store is selected and at step 3302 an incident score for the store is retrieved. In accordance with one embodiment, the incident score is a category 3 incident score. At step 3204, ranges of incident scores for vehicles are retrieved. At step 3306, resource allocator 234 determines if a vehicle should be allocated to a store based on what range the incident score falls within. In accordance with some embodiments, this involves comparing the incident score to a threshold incident score value. At step 3308, resource allocator 234 determines if there are more stores. If there are more stores, the process returns to step 3300 to select the next store. When all the stores have been processed at step 3308, the process ends at 3310.

Figure 34:
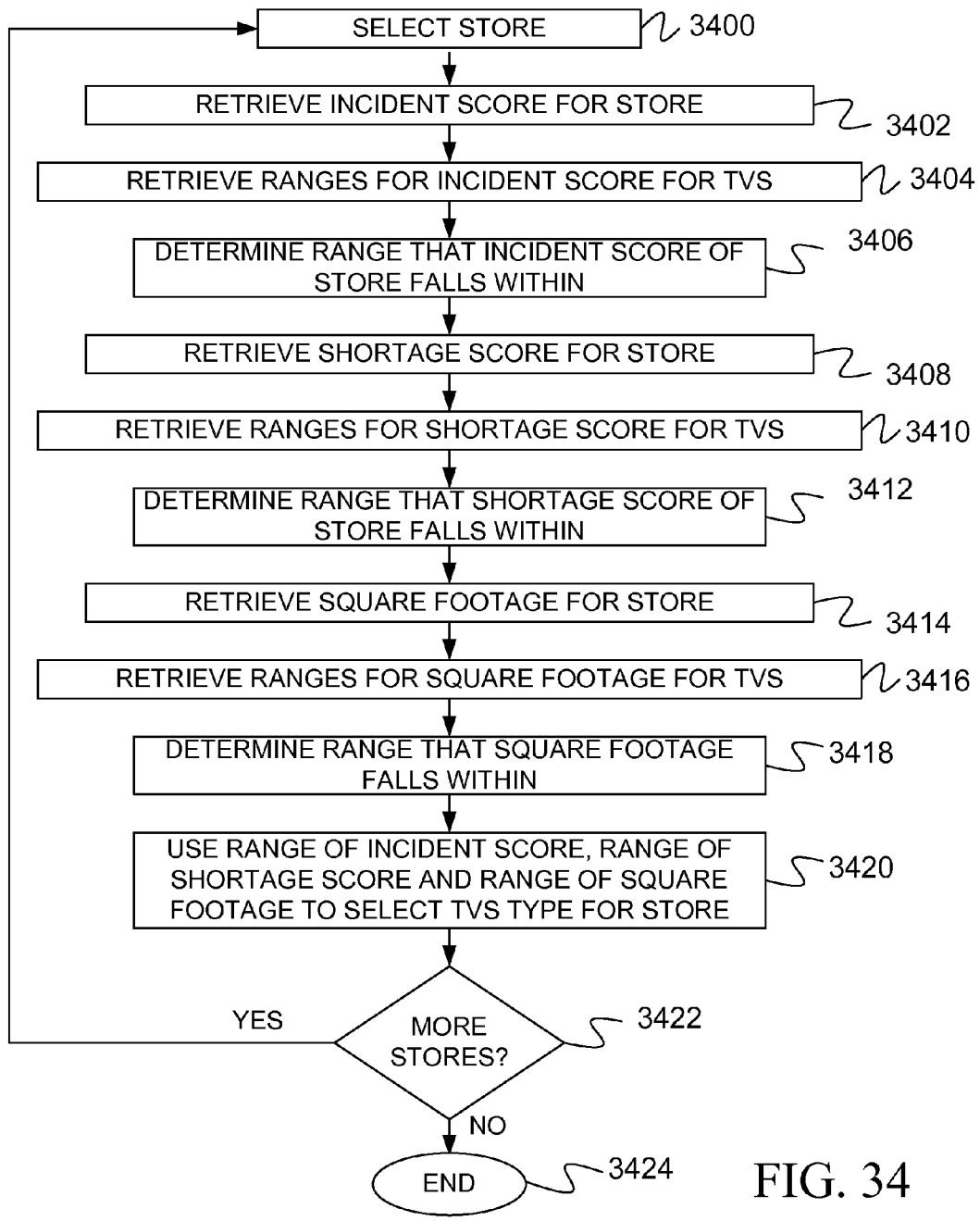
FIG. 34 is a flow diagram of a method of allocating TVS in accordance with one embodiment.

FIG. 34 provides a flow diagram of a method of allocating assets protection tools in the form of TVS to stores. At step 3400, a store is selected and at step 3402 an incident score for the store is retrieved. Under one embodiment, the incident score is a category 3 incident score. At step 3404, a bucket of ranges for TVS is retrieved for the incident score. In accordance with one embodiment, the buckets of ranges provide three buckets: high, medium and low. At step 3406, the resource allocator 234 determines which ranges the incident score of the store falls within. At step 3408, a shortage score is retrieved. In accordance with one embodiment, the shortage score is external ORC shortage. At step 3410, ranges of shortage scores for TVS are retrieved and at step 3412, resource allocator 234 determines which range the shortage score of the store falls within. At step 3414, a square footage for the store is retrieved. This may be retrieved from store attribute data 416. At step 3416, resource allocator 234 retrieves the ranges of square footage for TVS. At step 3418, the range that the square footage of the store falls within is determined. At step 3420, the range of the incident score, the range of the shortage score and the range of the square footage are used to select the TVS type.

Figure 35:
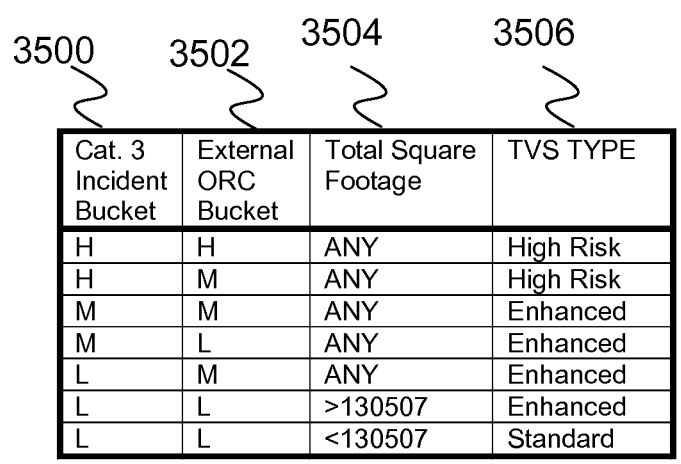
FIG. 35 is a table showing ranges of incident score, shortage score and square footage and associated TVS types.

In accordance with one embodiment, the selection is made using the table of FIG. 35. In FIG. 35, the range of the incident score is found in column 3500, the range of the shortage score is found in column 3502, the range of the total square footage is found in column 3504 and the TVS type is found in column 3506. In columns 3500 and 3502, there are three ranges: high (H), medium (M) and low (L). In column 3504 there are ranges of "any" available square footage, greater than 130, 507 square feet and less than 130,507 square feet. In column 3506, there are three types of TVS available: "high risk TVS," "enhanced TVS," and "standard TVS." In step 3414, resource allocator 234 determines if there are more stores. If there are more stores, the process returns to step 3400 to select the next store and steps 3402 through 3420 are repeated. When there are no more stores at step 3402, the process ends at step 3424.

Before the processes of FIGS. 31, 32, 33 and 34, stores can be grouped based on whether they have previously been assigned an assets protection tool. As a result of the processes of FIGS. 31, 32, 33 and 34, at least one of the stores that had been in the group of stores that had been allocated an assets protection tool will have its assets protection tool removed and at least one of the stores that had been in the group of stores that did not have the assets protection tool will have the assets protection tool allocated to it.

Returning to FIG. 1, after the resources have been initially allocated, they are adjusted at step 118 by resource adjustor 236. In particular, resource adjuster 236 uses budget constraints 238, overlapping roles 240 and role prioritization 214 to adjust the resource allocations. For example, if budget constraints would not allow for the hours allocations required by the incident scores or shortage scores, the hours allocated will be reduced. Similarly, if multiple roles overlap, one or more personnel may be removed. After the resource adjustments, a final resource allocation 242 is created.

The incident reporting tool, the score generating methods and the resource allocation methods must be performed on one or more computing systems because of the large number of stores, score types and possible allocations involved.

An example of a computing device that can be used as a server and/or client device in the various embodiments described above is shown in the block diagram of FIG. 36. The computing device 10 of FIG. 36 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the personal computer 10, is stored in ROM 18.

Embodiments of the present invention can be applied in the context of computer systems other than personal computer 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computer 10 further includes a hard disc drive 24, non-volatile solid-state memory 25 an external memory device 28, and an optical disc drive 30. External memory device 28 can include an external disc drive or solid state memory that may be attached to computer 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid-state memory and external memory devices and their associated computer-readable media provide nonvolatile storage media for the personal computer 10 on which computer-executable instructions and computer-readable data structures may be stored. Such computer-executable instructions can include instructions for performing any of the steps described in the methods above. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include the reporting tools, score generators, grouping units, frequency distribution generator, logistic model generator, resource allocator, resource adjuster, factor analysis, logistic modeler, incident probability calculator, RPN generator, count percentage calculator, and category incident score calculator discussed above and program data 44 may include data stored in any of the databases or tables discussed above including the APRI buckets, incident database, state crime rates, store demographic data, store attribute data, RPN table, incident category table, current store resource allocation, final resource allocation, budget constraints and role overlap.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 36. The network connections depicted in FIG. 36 include a local area network (LAN) 56 and a wide area network (WAN) 58. Such network environments are commonplace in the art.

The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the I/O interface 46.

Figure 36:
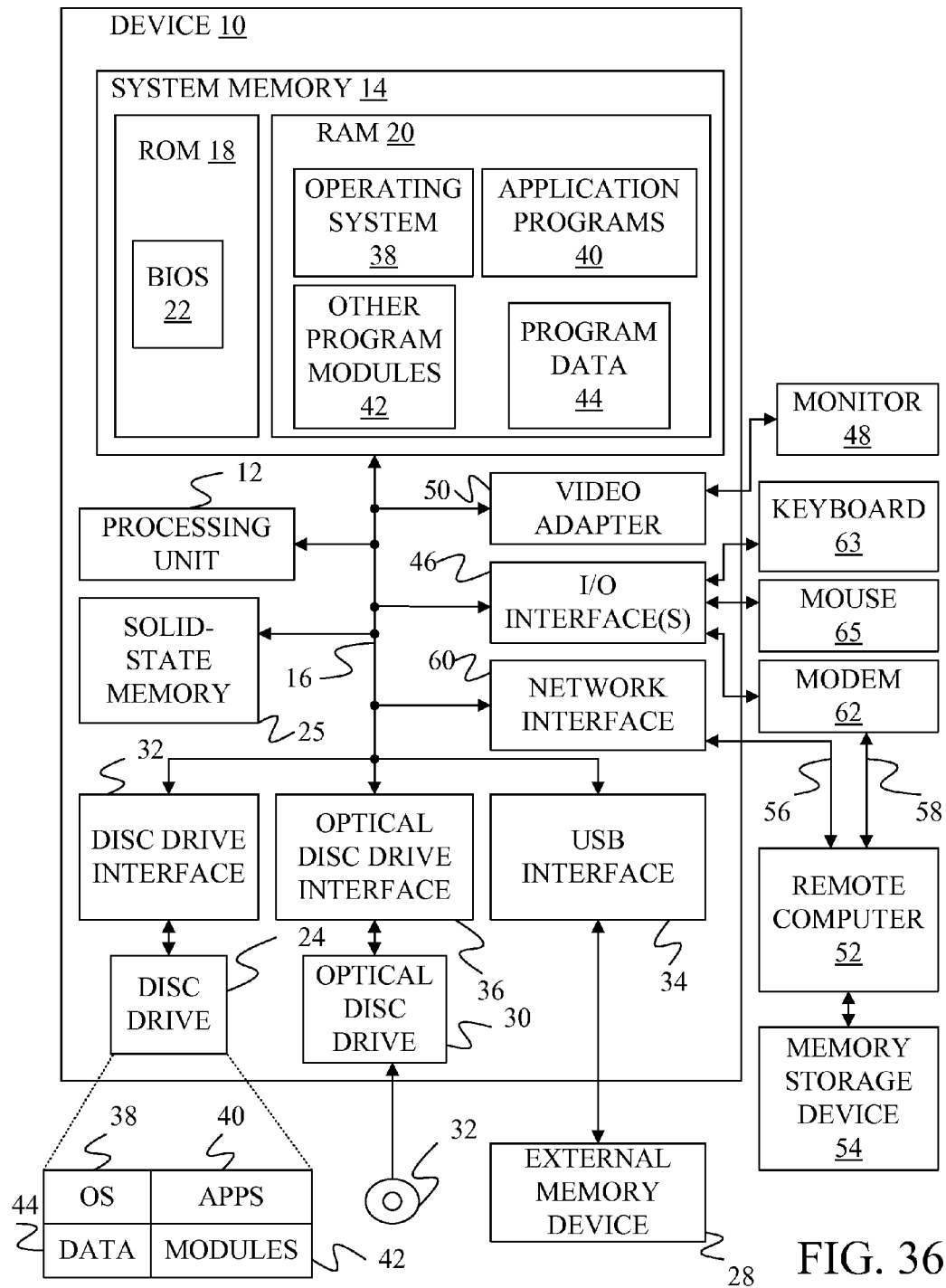
FIG. 36 is a block diagram of a computing device that can be used to perform the methods described herein.

In a networked environment, program modules depicted relative to the personal computer 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 36 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
    generating an incident score based on a probability of an incident occurring on a store property;
    retrieving from a computer memory, a set of ranges of incident scores, each range being associated with a number of hours of security personnel time;

identifying a range of incident scores in the set of ranges of incident scores that the generated incident score falls within and retrieving an associated number of hours of security personnel time; and assigning security personnel time to the store property using a processor based on the number of hours of security personnel time retrieved for the identified range of incident scores.

2. The method of claim 1 wherein generating the incident score further comprises generating a risk priority number that is a function of a severity measure of the incident, an occurrence measure of the incident, and an ability-to-impact measure of the incident and multiplying the probability of the incident occurring on store property by the risk priority number.

3. The method of claim 2 wherein the occurrence measure of the incident provides a measure of a percentage of stores in which the incident occurred over a selected period of time.

4. The method of claim 3 wherein the ability-to-impact measure of the incident provides a measure of an ability to reduce how many times the incident occurs by providing more resources.

5. The method of claim 1 further comprising:
generating a second incident score based on a probability of a second incident occurring on a store property;
retrieving from a computer memory, a set of ranges of second incident scores, each range being associated with a number of hours of security personnel time;
identifying a range of second incident scores in the set of ranges of second incident scores that the generated second incident score falls within and retrieving an associated second number of hours of security personnel time; and
wherein assigning security personnel time to the store property using a processor comprises assigning security personnel time to the store property based on the retrieved number of hours of security personnel time and the retrieved second number of hours of security personnel time.

6. The method of claim 5 wherein assigning security personnel time to the store property based on the retrieved number of hours of security personnel time and the retrieved second number of hours of security personnel time comprises selecting one of the retrieved number of hours of security personnel time or the retrieved second number of hours of security personnel time based on the retrieved number of hours of security personnel time.

7. The method of claim 1 further comprising generating the probability of an incident occurring on a store property using a logistic function having a state crime rate as one of its independent variables.

8. The method of claim 1 further comprising generating the probability of an incident occurring on a store property using a logistic function having a count of the number of people living within a selected distance of the store property as one of its independent variables.

9. The method of claim 1 further comprising generating the probability of an incident occurring on a store property using a logistic function having a percentage of a population that are college graduates as one of its independent variables.

10. The method of claim 1 further comprising generating the probability of an incident occurring on a store property using a logistic function having a total square footage of a store on the store property as one of its independent variables.

11. The method of claim 1 further comprising generating the set of ranges of incident scores and associating a number of hours of security personnel time to each range of incident scores through steps comprising:
grouping stores based on a number of hours of security personnel time previously assigned to the stores such that each store in each group has the same number of security personnel hours assigned to the store;
determining an incident score for each store;
for a selected group of stores:
determining a mean incident score of a distribution of incident scores for the selected group of stores;
identifying an incident score that is a standard deviation less than the mean incident score as a lower range limit of incident scores for the number of hours of security personnel time assigned to the selected group; and
identifying an incident score that is a standard deviation greater than the mean incident score as an upper range limit of incident scores for the number of hours of security personnel time assigned to the selected group.

12. A method comprising:
generating an incident score based on a probability of an incident occurring on a store property;
retrieving from a computer memory, a set of ranges of incident scores, each range being associated with a number of hours of security personnel time;
identifying a range of incident scores in the set of ranges of incident scores that the generated incident score falls within and retrieving an associated first number of hours of security personnel time;
generating a shortage score for the store property for a first type of shortage, the shortage score representative of a dollar amount of shortage due to the first type of shortage,
retrieving from a computer memory, a set of ranges of shortage scores for the first type of shortage, each range being associated with a respective different number of hours of security personnel time;
identifying a range of shortage scores in the set of ranges of shortage scores that the generated shortage score falls within and retrieving an associated second number of hours of security personnel time; and
using a processor assigning security personnel time to the store property based on the retrieved first number of hours of security personnel time and the retrieved second number of hours of security personnel time.

13. The method of claim 12 wherein generating a shortage score for a first type of shortage comprises:
for each department in the store property:
determining a percentage of thefts due to a first type of shortage;
multiplying the percentage of thefts due to the first type of shortage by a dollar amount that reflects theft losses over multiple years to produce a dollar amount due to the first type of shortage;
scaling the dollar amount due to the first type of shortage to form a department shortage score for the first type of shortage; and
summing the department shortage scores for the first type of shortage across all departments in a store to obtain the shortage score for the store property for the first type of shortage.

14. The method of claim 12 further comprising determining a separate shortage score for the store property for each of a plurality of different types of shortage.

15. The method of claim 12 further comprising:
generating an apprehension score based on a dollar amount of apprehensions;
retrieving from a computer memory, a set of ranges of apprehension scores, each range being associated with a respective different number of hours of security personnel time;
identifying a range of apprehension scores in the set of ranges of apprehension scores that the generated apprehension score falls within and retrieving an associated third number of hours of security personnel time; and
assigning security personnel time to the store property based on the retrieved first number of hours of security personnel time, the retrieved second number of hours of security personnel time and the retrieved third number of hours of security personnel time.

16. The method of claim 15 wherein assigning security personnel time to the store property based on the retrieved first number of hours of security personnel time, the retrieved second number of hours of security personnel time and the retrieved third number of hours of security personnel time comprises adding the retrieved first number of hours of security personnel time, the retrieved second number of hours of security personnel time and the retrieved third number of hours of security personnel time to form a sum, comparing the sum to at least one threshold and assigning security personnel time in response to the comparison.

17. A computer-implemented method comprising:
generating an incident score based on a probability of an incident occurring on a store property;
retrieving from a computer memory, a set of ranges of incident scores, each range being associated with a number of hours of security personnel time;
identifying a range of incident scores in the set of ranges of incident scores that the generated incident score falls within and retrieving an associated number of hours of security personnel time;
assigning security personnel time to the store property using a processor based on the number of hours of security personnel time retrieved for the identified range of incident scores;
generating a shortage score representative of a dollar amount of shortage at the store property that is attributed to a first type of shortage;
applying the incident score to a first table in computer memory to identify a first level of leadership;
applying the shortage score to a second table in computer memory to identify a second level of leadership; and
examining the first level of leadership and the second level of leadership to assign a level of leadership to the store property.

18. The computer-implemented method of claim 17 wherein examining the first level of leadership and the second level of leadership to assign a level of leadership to the store comprises determining which of the first level of leadership and the second level of leadership is higher in a hierarchical organization chart and selecting the higher of the first level of leadership and the second level of leadership to assign to the store property.

19. A method comprising:
generating an incident score based on a probability of an incident occurring on a store property;
retrieving from a computer memory, a set of ranges of incident scores, each range being associated with a number of hours of security personnel time;
identifying a range of incident scores in the set of ranges of incident scores that the generated incident score falls within and retrieving an associated number of hours of security personnel time;
assigning security personnel time to the store property using a processor based on the number of hours of security personnel time retrieved for the identified range of incident scores;
providing a shortage score generator determining a shortage score for each store in a set of stores;
providing a grouping unit grouping the stores into a first group if the store has an assets protection tool and a second group if the store does not have the assets protection tool; and
providing a resource allocator:
identifying those stores in the first group that have a shortage score that is less than a first threshold and removing the assets protection tool from the identified stores of the first group; and
identifying those stores in the second group that have a shortage score that is greater than a second threshold and adding the assets protection tool to the identified stores of the second group.

20. The method of claim 19 wherein the first threshold and the second threshold are the same.

* * * * *